(12) United States Patent
Matthews et al.

(10) Patent No.: US 10,263,919 B1
(45) Date of Patent: Apr. 16, 2019

(54) BUFFER ASSIGNMENT BALANCING IN A NETWORK DEVICE

(71) Applicant: Innovium, Inc., San Jose, CA (US)

(72) Inventors: William Brad Matthews, San Jose, CA (US); Puneet Agarwal, Cupertino, CA (US); Bruce Hui Kwan, Sunnyvale, CA (US); Ajit Kumar Jain, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 15/804,779

(22) Filed: Nov. 6, 2017

(51) Int. Cl.
*G06F 12/08* (2016.01)
*H04L 12/861* (2013.01)
*H04L 12/803* (2013.01)

(52) U.S. Cl.
CPC ........ *H04L 49/9047* (2013.01); *H04L 47/125* (2013.01)

(58) Field of Classification Search
None
See application file for complete search history.

(56) References Cited

U.S. PATENT DOCUMENTS

2016/0350232 A1* 12/2016 Knies ................... G06F 12/0888
2017/0371794 A1* 12/2017 Kan ....................... G06F 3/0652

\* cited by examiner

*Primary Examiner* — Kouroush Mohebbi
(74) *Attorney, Agent, or Firm* — Wong & Rees LLP; Karl T. Rees

(57) ABSTRACT

Techniques for more optimally balancing operations across a set of buffers, such as in buffering packets in a network device or in other contexts, are disclosed. The techniques make use of an ordered list of buffers from which the next available buffer is selected for each operation, as needed. The buffers are first prioritized based on the state(s) of the relevant buffers and/or other factors. The resulting ordered list is then processed using re-ordering logic. This re-ordering logic may, for example, randomly or pseudo-randomly trade the positions of various sets of buffers within the prioritized list. Among other effects, the re-ordering logic thus reduces buffer skew problems from delayed propagation of buffer state information and other issues. In an embodiment, the re-ordering logic is divided into multiple levels of processing, with each level separately passing through the list. Each level of processing may utilize differently configured re-ordering logic.

20 Claims, 9 Drawing Sheets

BUFFER ASSIGNMENT BALANCING IN A NETWORK DEVICE

TECHNICAL FIELD

Embodiments relate generally to data buffering, and, more specifically, to techniques for assigning data to buffers within a network device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network router may determine one or more other networking devices, among a number of possible other networking devices, to forward the IP data packet to.

In these and other contexts, a network device or other computing device often needs to temporarily store data in one or more memories or other storage media until resources become available to process the data. The storage media in which such data is temporarily stored is often logically and/or physically divided into discrete regions or sections referred to as data buffers (or, simply, "buffers"). The rules and logic utilized to determine which data is stored in what buffer is a significant system design concern having a variety of technical ramifications, including without limitation the amount of storage media needed to implement buffers, the speed of that media, how that media is interconnected with other system components, and/or the manner in the buffered data is queued and processed.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
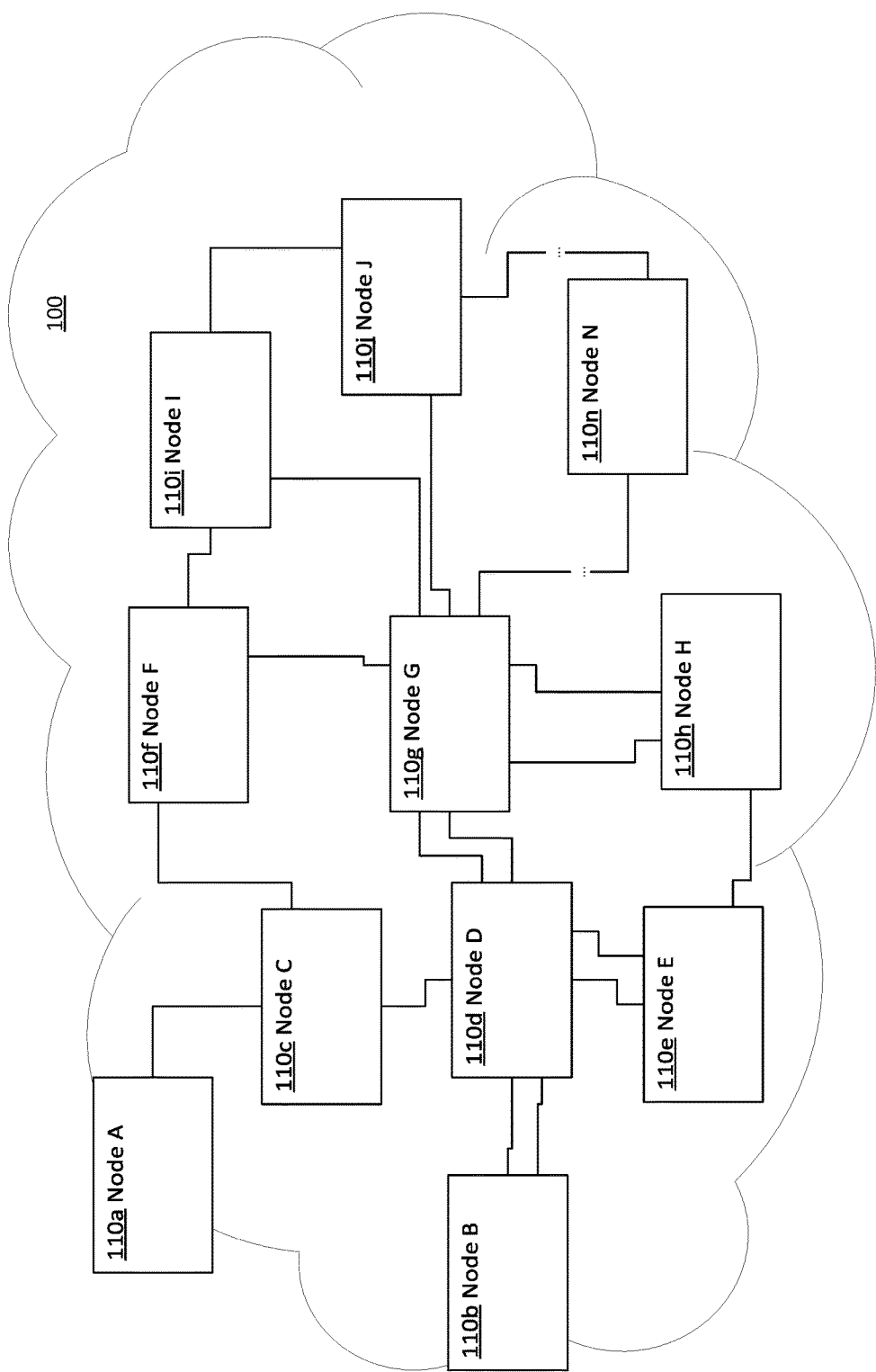
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Network Packets
2.2. Network Paths
2.3. Network Device
2.4. Ports
2.5. Packet Processors
2.6. Traffic Management
2.7. Advanced Buffer Assignment Subsystem
2.8. Miscellaneous
3.0. Functional Overview
3.1. Writing Data Units to Buffers
3.2. Determining a Buffer Write Order for Example Buffer List
3.3. Determining a Buffer Write Order, Generally
4.0. Example Embodiments
5.0. Implementation Mechanism—Hardware Overview
6.0. Extensions and Alternatives

1.0. General Overview

Approaches, techniques, and mechanisms are disclosed for more optimally balancing operations across a set of buffers, such as in buffering packets in a network device or in other contexts. The techniques make use of an ordered list of buffers from which the next available buffer is selected for each operation, as needed. Rather than simply sorting the buffers in an order based on how full or utilized a resource accounting mechanism last reported the buffers to be, a modified prioritized list of buffers is utilized. The buffers are first prioritized based on the state(s) of the relevant buffers and/or other factors. The resulting ordered list is then processed using re-ordering logic. This re-ordering logic may, for example, randomly or pseudo-randomly trade the positions of various sets of buffers within the prioritized list.

Among other effects, the re-ordering logic thus reduces buffer skew problems from delayed propagation of buffer state information and other issues. In some embodiments, the techniques are particularly utilized for assigning new data to buffers for writing. The techniques balance between assigning the new data to higher priority (typically emptier) buffers and other buffers that might otherwise not be prioritized for writing. However, in other embodiments, the techniques may be adapted to other types of operations by adjusting the initial priority scheme accordingly (e.g. in the case in the case of reading from buffers, prioritizing fuller buffers instead of emptier buffers). In an embodiment, the techniques are well-suited to buffers implemented using single-ported memories, though again the techniques may be utilized in other contexts.

In an embodiment, the re-ordering logic is divided into multiple levels of processing, with each level separately passing through the list (or the list as already modified in one or more other levels). In each level of processing, the list is segmented into sets of one or more buffers. Adjacent sets, or other groupings of sets, may be randomly or pseudo-randomly selected for re-ordering. When a group of the sets is selected for re-ordering, the positions of the sets within the list are exchanged without modifying the positions of the buffers within the sets relative to the positions of any other buffers within the set. Each level of processing may utilize differently configured re-ordering logic. For instance, the rate at which a given set is selected for re-ordering may lessen at higher levels of processing.

Example operations and memory structures adapted for generating the modified prioritized list of buffers are described. In an embodiment, the re-ordering logic is efficiently implemented in hardware using distinct memory structures to represent the list at each level and switches to direct the value of each slot in one memory structure to either a same or a corresponding reprioritized slot in another memory structure. In other embodiments, the techniques may instead be implemented by manipulating arrays of buffer identifiers in software.

In other aspects, the inventive subject matter encompasses computer apparatuses and/or computer-readable media configured to carry out the foregoing techniques.

2.0. Structural Overview

FIG. 1 is an illustrative view of various aspects of an example networking system 100, also referred to as a network, in which the techniques described herein may be practiced, according to an embodiment. Networking system 100 comprises a plurality of interconnected nodes 110*a*-110*n* (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Network Packets

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g. a TCP segment) to a second node 110 over a path that includes an intermediate node 110. This data unit 110 will be broken into smaller data units ("subunits") at various sublevels before it is transmitted from the first node 110. For example, the data unit may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild the subunits (e.g. packets or frames) and route those subunits to the second node 110 without ever composing the entire original data unit.

When a node 110 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 110 is not the destination for the data unit, the node may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the packet, a label to attach the packet, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing IP packets in an L3 (level 3) network, in which context the described techniques have particular advantages. It will be recognized, however, that these techniques may also be applied to realize advantages in routing other types of data units conforming to other protocols and/or or at other communication layers within a network. Thus, unless otherwise stated or apparent, the term "packet" as used herein should be understood to refer to any type of data structure communicated across a network, including packets as well as segments, cells, data frames, datagrams, and so forth.

2.2. Network Paths

Any node in the depicted network 100 may communicate with any other node in the network 100 by sending packets through a series of nodes 110 and links, referred to as a path. For example, Node B (110*b*) may send packets to Node H (110*h*) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a packet that it sends. Rather, the node 110 may simply be configured to calculate the best path for the packet out of the device (e.g. which egress port it should send the packet out on). When a node 110 receives a packet that is not addressed directly to the node 110, based on header information associated with a packet, such as path and/or destination information, the node 110 relays the packet along to either the destination node 110, or a "next hop" node 110 that the node 110 calculates is in a better position to relay the packet to the destination node 110. In this manner, the actual path of a packet is product of each node 110 along the path making routing decisions about how best to move the packet along to the destination node 110 identified by the packet.

2.3. Network Device

Figure 2:
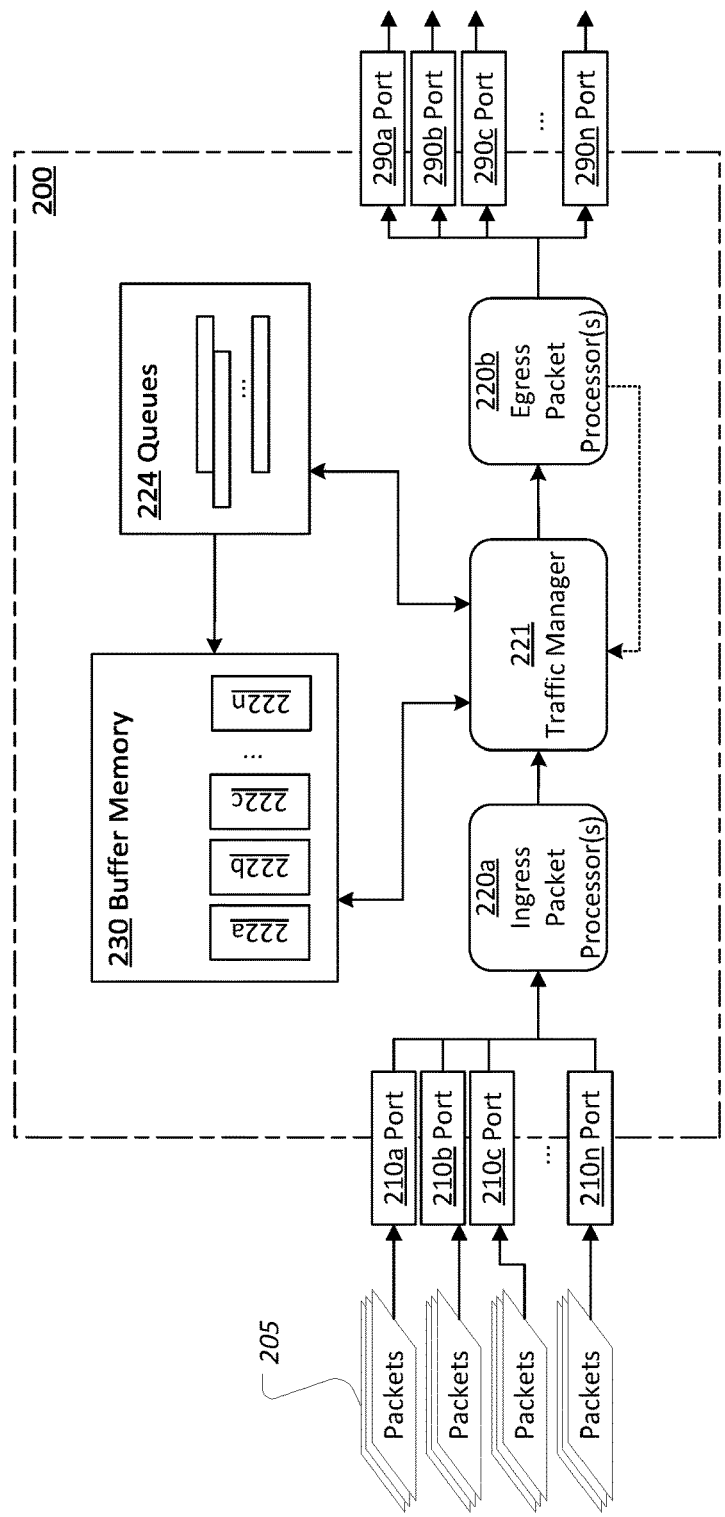
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. Note that, in an embodiment, some or all of the nodes 110 in system 100 may each be a separate network device 200.

In another embodiment, device 200 may be one of a number of components in a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip. The network switch or router may even include multiple devices 200.

2.4. Ports

Network device 200 includes ports 210/290. Ports 210, including ports 210*a-n*, are inbound ("ingress") ports by which data units referred to herein as packets 205 are received over a network, such as network 110. Ports 290, including ports 290*a-n*, are outbound ("egress") ports by which at least some of the packets 205 are sent out to other destinations within the network, after having been processed by the network device 200.

Ports 210/290 are depicted as separate ports for illustrative purposes, but may actually correspond to the same physical hardware ports (e.g. network jacks or interfaces) on the network device 210. That is, a network device 200 may both receive packets 205 and send packets 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or multiple egress ports into a single ingress port 210 or egress port 290. Hence, in various embodiments, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 220a. On the other end, an egress packet processor 220b may input data units serially into another SerDes block, which outputs the data units in parallel to ports 290.

2.5. Packet Processors

A device 200 comprises one or more packet processing components 220, such as the depicted ingress packet processor 220a and egress packet processor 220b, that collectively implement forwarding logic by which the device 200 is configured to determine how to handle each packet the device 200 receives. These packet processors 220 may be any suitable combination of fixed circuitry and/or software-based logic, such as specific logic components implemented by one or more Field Programmable Gate Arrays (FPGAs) or Application-Specific Integrated Circuits (ASICs), or a general purpose processor executing software instructions.

Different packet processors 220 may be configured to perform different packet processing tasks. For instance, some packet processors may forward packets 205 out egress ports 290, other packet processors 220 may implement flow control mechanisms, other packet processors 220 may perform statistical collection or debugging tasks, and so forth. A device 200 may comprise any number of packet processors 220 configured to perform any number of processing tasks.

In an embodiment, the packet processors 220 of a device 200 are arranged such that the output of one packet processor 220 is, eventually, input into another processor 220, in such a manner as to pass packets 205 from certain packet processor(s) 220 to other packet processor(s) 220 in a sequence of stages, until finally disposing of the packets 205 (e.g. by sending the out an egress port 290, "dropping" the packets 205, etc.). The exact set and/or sequence of packet processors 220 that process a given packet 220 may vary, in some embodiments, depending on the attributes of the packet 220 and/or the state of the device 200.

Ingress and Egress Processors

In an embodiment, a packet processor 220 may be generally classified as an ingress packet processor 220a or an egress packet processor 220b. Generally speaking, an ingress packet processor 220a performs certain routine intake tasks on packets 205 as they arrive. These intake tasks are typically relatively minor, such as categorically blocking packets 205 with certain attributes and/or when the device 200 is in a certain state, duplicating certain types of packets, making initial categorizations of packets, and so forth. These intake tasks are generally tasks that can be performed relatively quickly, so as to not require prolonged buffering of the packets 205. In an embodiment, there may be fewer ingress packet processors 220a relative to egress packet processor(s) 220b, or even just one ingress packet processor 220a.

The egress packet processor(s) 220b of a device 200, by contrast, are configured to perform all non-intake tasks necessary to implement the forwarding logic of the device 200. These tasks may include, for example, tasks such as identifying paths along which to forward the packets, implementing flow control and/or other policies, manipulating packets, performing statistical or debugging operations, and so forth. These tasks may be more complex than the intake tasks, and may in many cases require some sort of prolonged buffering in order to handle large volumes of traffic. In an embodiment, there may be different egress packet processors(s) 220b assigned to different flows or other categories of traffic, such that not all packets 205 will be processed by the same egress packet processor 220b.

In an embodiment, multiple egress packet processor(s) 220b may be chained together such that a packet 205 processed by a first egress packet processor 220b is later processed by a second egress packet processor 220b configured to send the packet 205 out a specific port 290. There is no limit to the number of packet processor(s) 220b within such a chain.

Forwarding Logic and Tables

As mentioned, the packet processors 220 collectively implement the forwarding logic of a device 200. The forwarding logic of a device 200, or portions thereof, may, in some instances, be hard-coded into the packet processors 220. For instance, the device 200 may be configured to always react to certain types of data units in certain circumstances in a certain way. The forwarding logic, or portions thereof, may also be configurable, in that the logic changes over time in response to data collected from or instructions received from other nodes in the network in which the device 200 is located.

For example, a device 200 will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component. For instance, such attributes or characteristics may include a Quality-of-Service level specified by the data unit or associated with another characteristic of the data unit, a flow control group, an ingress port 210 through which the data unit was received, a tag or label in the packet's header, a source address, a destination address, a packet type, or any other suitable distinguishing property.

In an embodiment, forwarding logic may read port state data. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

According to an embodiment, the forwarding logic reads certain instructions for handling network traffic from one or more tables. Generally, the tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, system 200 comprises path management control logic that is configured to adjust the forwarding instructions described by a forwarding table based on a variety of factors. For example, path management control logic may be configured to recognize administrative commands that explicitly instruct the path management control logic to add or remove address groups or adjust existing instructions for a group. Path management control logic may also adjust forwarding instructions in response to events that imply changes to the forwarding instructions, such as the receipt of data units that announce the availability of new paths in a network, the dropping of a certain number of packets to a destination, the application of certain flow control measures, or any other suitable event.

In an embodiment, groups of addresses are described using an address prefix. This prefix is, in essence, a beginning address portion that is common to each address in the group. The beginning address portion may be, for instance, a first number of bits, bytes, or other element. As used herein, a "prefix entry" generally refers to a data entry (i.e. in a forwarding table) which maps a particular prefix to one or more actions to be performed with respect to network packets or other data structures associated with an input key (e.g. address) that matches the particular prefix. Thus, when determining how to handle a certain packet, forwarding logic may determine a group of addresses that a data packet is associated with (e.g. a destination subnet, source subnet, etc.) using a prefix, and perform the one or more actions associated with that group.

2.6. Traffic Management

Buffers

Since not all packets 205 received by the device 200 can be processed by the packet processor(s) 220 at the same time, a traffic manager 221 of device 200 may temporarily store packets 205 in memory structures referred to as buffers 222 while the packets 205 are waiting to be processed. For example, a certain egress packet processor 220b may only be capable of processing a certain number of packets 205, or portions of packets 205, in a given clock cycle, meaning that other packets 205, or portions of packets 205, must either be ignored (i.e. dropped) or stored. At any given time, a large number of packets 205 may be stored in the buffers 222 of the device 200, depending on network traffic conditions.

Buffers 222, depicted in FIG. 2 as individual buffers 222a-n, collectively form a buffer memory 230. Each buffer 222 may be a portion of any type of memory, including volatile memory and/or non-volatile memory. In an embodiment, each buffer 222 is a distinct single-ported memory, supporting only a single input/output (I/O) operation per clock cycle (i.e. either a single read operation or a single write operation). Single-ported memories may be utilized for higher operating frequency, though in other embodiments multi-ported memories may be used instead. In an embodiment, each of these buffers 222 is capable of being accessed concurrently with each other buffer 222 in a same clock cycle, though full realization of this capability is not necessary. In an embodiment, each buffer is a distinct memory bank, or set of memory banks. In yet other embodiments, a buffer may be a region within a memory bank. In an embodiment, each buffer comprises many addressable "slots" or "entries" (e.g. rows, columns, etc.) in which packets 205, or portions thereof, may be stored.

The number of buffers 222 may vary depending on the embodiment. In an embodiment where buffers 222 are single-ported, the number of buffers 222 may be a function of the total number of a possible read and write operations for the traffic manager 221 in a single clock cycle. For instance, if each port 210 is capable of receiving a single packet 205 in a clock cycle, and each packet 205 must be buffered, and if traffic manager 221 is further capable of dequeueing (reading) a single buffer entry in the clock cycle, then there may be at least as many buffers 222 as there are ports 205, plus an extra buffer 222 for the dequeue operation. Additional buffers 222 might also be added to support advertised memory capabilities, large traffic bursts, and so forth. Of course, other system configurations and designs may warrant other numbers of buffers 222.

The traffic manager 221 may include a buffer manager configured to manage use of buffers 222 by device 200. Among other processing tasks, the buffer manager may, for example, allocate and deallocate specific segments of memory for buffers 222, create and delete buffers 222 within that memory, identify available buffer entries in which to store a newly received packet 205, maintain a mapping of buffers entries to packets 205 stored in those buffers entries (e.g. by a packet sequence number assigned to each packet 205 as the packet 205 is received), mark a buffer entry as available when a packet 205 stored in that buffer 222 is dropped or sent from the device 200, determine when to drop a packet 205 instead of storing the packet 205 in a buffer 222, perform garbage collection on buffer entries for packets 205 (or portions thereof) that are no longer needed, and so forth.

In an embodiment, the traffic manager 221 is coupled to the ingress packet processor(s) 220*a*, such that packets 205 (or portions thereof) are assigned to buffers 222 only upon being initially processed by a packet processor 220*a*. Once in a buffer 222, a packet 205 (or portion thereof) may be "released" to one or more egress packet processor(s) 220*b* for processing, either by the traffic manager 224 sending a link or other suitable addressing information for the corresponding buffer 222 to the egress packet processor 220*b*, or by sending the packet 205 directly.

Device 200 includes buffer assignment logic in the buffer manager of traffic manager 221 and/or in each ingress packet processor 220*a*. The buffer assignment logic is configured to identify which buffer should be utilized to store a given packet 205, or portion thereof. In some embodiments, each packet 205 is stored in a single entry within its assigned buffer 222. In yet other embodiments, a packet 205 is received as, or divided into, constituent data units such as fixed-size cells or frames. The buffers 222 may store these constituent data units separately (e.g. not in the same location, or even the same buffer). The constituent data units may even pass through queues 224 separately. In view of these variations between embodiments, to simplify the remainder of this description, the buffer assignment logic will simply be said to assign different data units to different buffers 222, which data units may be complete packets 205, or subunits thereof, depending on the embodiment.

In some embodiments, the buffer assignment logic is relatively simple, in that data units are assigned to buffers 222 randomly or using a round-robin approach. In some embodiments, data units are assigned at least partially based on characteristics of those data units, such as corresponding traffic flows, destination addresses, source addresses, ingress ports, and/or other metadata. For example, different buffers 222 or sets of buffers 222 may be utilized to store data units received from different ports or sets of ports. In an embodiment, the buffer assignment logic also or instead utilizes buffer state information, such as utilization metrics, to determine which buffer 222 to assign to a data unit. In an embodiment, the buffer assignment logic may further include advanced assignment logic, such as a reprioritization mechanism, as described in other sections.

Queues

In an embodiment, to manage the order in which packets 205 are processed from the buffers 222, traffic manager 221 implements queueing logic. Each packet 205, or the buffer locations(s) in which it is stored, is said to belong to one or more constructs referred to as queues 224. Typically, a queue 224 is a set of memory locations (i.e. in buffers 222) arranged in some order by metadata describing the queue. The memory locations may (and often are) non-contiguous relative to their addressing scheme and/or physical arrangement. For example, the metadata for one queue may indicate that the queue is comprised of, in order, entries 1, 50, 3, and 92 in a certain buffer 222.

A device 200 may have many queues 224, and each packet processor 220 (or the traffic manager 221) may be associated with one or more of the queues 224, to regulate which packet 205 is processed at which time. The sequence in which the queue 224 arranges its constituent packets 205 generally corresponds to the order in which the packets 205 in the queue 224 will be processed. In some embodiments, the number of packets 205 assigned to a given queue 224 at a given time may be limited, either globally or on a per-queue basis, and this limit may change over time.

Beyond managing the use of buffers 222 to store packets 205 (or copies thereof), the traffic manager 221 may assign buffer entries to queues 224 and manage the flow of packets 205 through the queues 224. The traffic manager 221 may, for instance, identify a specific queue 224 to assign a packet 205 to upon ingress of the packet 205. The traffic manager 221 may further determine when to release—also referred to as "dequeuing"—packets 205 (or portions thereof) from queues 224 and provide that data to specific packet processor(s) 220. The traffic manager 221 may further "deallocate" entries in buffer 222 that are no longer being utilized when the data stored within those entries are dequeued from their respective queues. These entries are then reclaimed for use in storing new data. This process of deallocating and reclaiming buffer entries is referred to as garbage collection.

In an embodiment, different queues 224 may exist for different destinations. For example, each port 210 and/or port 290 may have its own set of queues 224. The queue 224 to which an incoming packet 205 is assigned may therefore be selected based on the port 210 through which it was received, while the queue 224 to which an outgoing packet is assigned may be selected based on forwarding information indicating which port 290 the packet should depart from. A different packet processor may be associated with each different set of one or more queues 224. Hence, the current processing context of the packet 205 may be used to select which queue 224 a packet 205 should be assigned to.

In an embodiment, there may also or instead be different queues 224 for different flows or sets of flows. That is, each identifiable traffic flow or group of traffic flows is assigned its own set of queues 224 to which its packets 205 are respectively assigned. In an embodiment, different queues 224 may correspond to different classes of traffic or quality-of-service (QoS) levels. Different queues 224 may also or instead exist for any other suitable distinguishing property of the packets 205, such as source address, destination address, packet type, and so forth.

For instance, a data unit may be forwarded to another queue 224 associated with another processing stage implemented by another set of processing components, sent out of the device 200 over an outbound port 290, discarded, delayed for flow control reasons, and so forth. The collective actions of these processing components over these multiple stages is said to implement the forwarding logic of the device 200.

Though only one pair of packet processors 220 and a single traffic manager 221 are depicted, a device 200 may comprise any number of packet processors 220 and traffic managers 221. For instance, different sets of ports 210 and/or ports 290 may have their own traffic manager 221 and packet processors 220. As another example, in an embodiment, the traffic manager 221 may duplicated for some or all of the stages of processing a packet. For example, system 200 may include a traffic manager 221 and egress packet processor 220*b* for an egress stage performed upon the packet 205 exiting the system 200, and/or a traffic manager 221 and packet processor 220 for any number of intermediate stages. The packet 205 may thus pass through any number of traffic managers 221 and/or packet processors 220 prior to exiting the system 200. In other embodiments, only a single traffic manager 221 is needed. If intermediate processing is needed, flow of a packet 205 may "loop back" to the traffic manager 221 for buffering and/or queuing after each stage of intermediate processing.

An example flow of a packet 205 through device 200 is as follows. The packet 205 may be received by a port 210. The packet 205 is then processed by an ingress packet processor 220a, and then delivered to a traffic manager 221. Traffic manager 221 stores the packet 205 in a buffer 222 and assigns the packet 205 to a queue 224. Traffic manager 221 manages the flow of the packet 205 through the queue 224 until the packet 205 is released to an egress packet processor 220b. Depending on the processing, the traffic manager 221 may then assign the packet 205 to another queue 224 so that it may be processed by yet another processor 220, or the packet processor 220b may send the packet 205 out another port 290.

In the course of processing a packet 205, a device 200 may replicate a packet 205 one or more times. For example, a packet 205 may be replicated for purposes such as multicasting, mirroring, debugging, and so forth. Thus, a single packet 205 may be replicated to multiple queues 224. Hence, though certain techniques described herein may refer to the original packet 205 that was received by the device 200, it will be understood that those techniques will equally apply to copies of the packet 205 that have been generated for various purposes. A copy of a packet 205 may be partial or complete. Moreover, there may be actual physical copy of the packet 205 in buffers 222, or a single copy of the packet 205 may be linked from a single buffer location 222 to multiple queues 224 at the same time.

2.7. Advanced Buffer Assignment Subsystem

Figure 3:
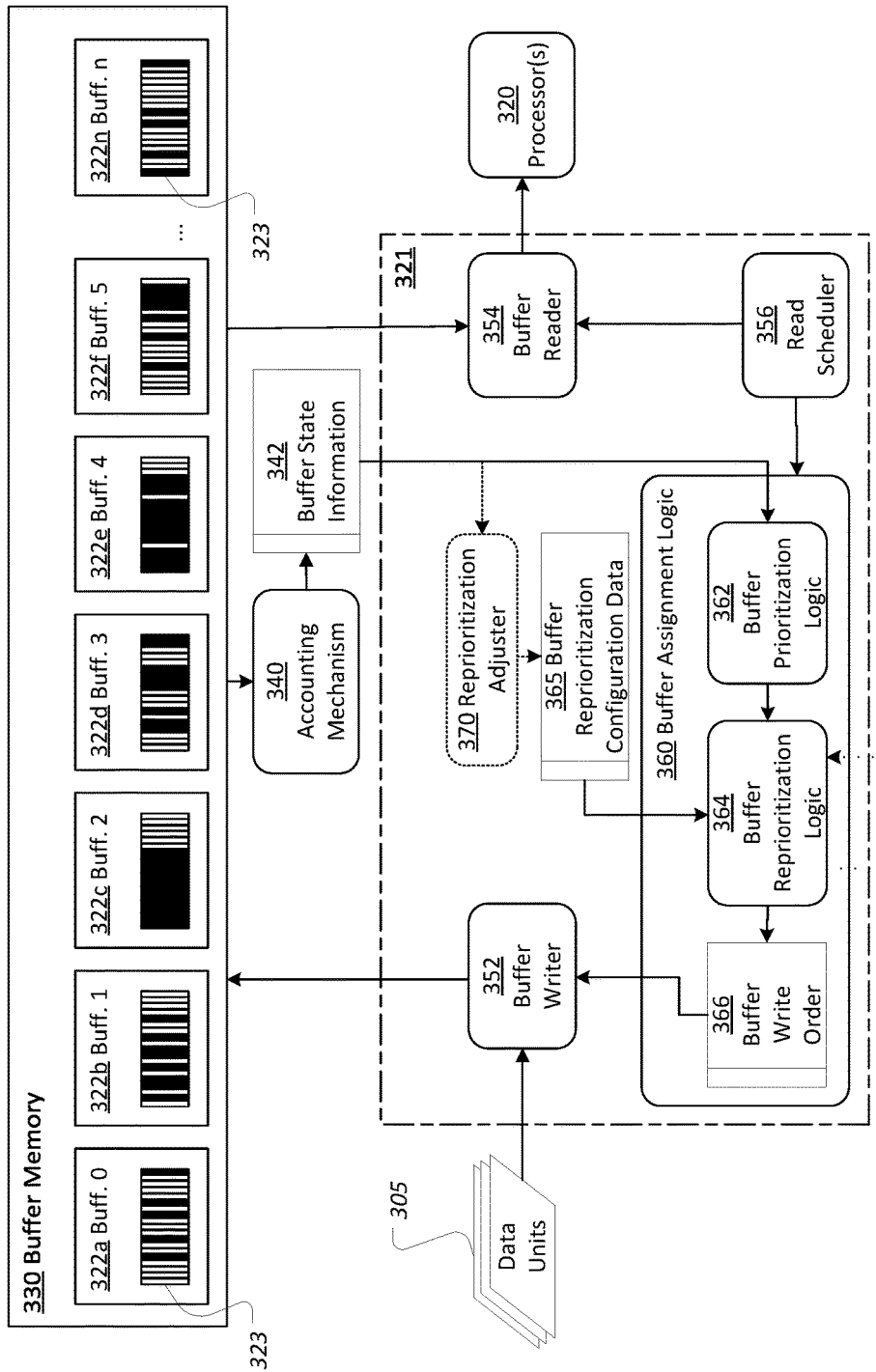
FIG. 3 illustrates an example buffer assignment subsystem which may be utilized to implement the advanced buffer assignment techniques described herein.

FIG. 3 illustrates an example buffer assignment subsystem 300 which may be utilized to implement the advanced buffer assignment techniques described herein. Subsystem 300 may, for example, be utilized within device 200 to determine which packets 205 to store in which buffers 222. On the other hand, subsystem 300 may be utilized in a variety of other contexts where data units 305 are stored in buffers 222, and need not be limited to the specific example context of device 200, or even to networking systems at all.

Subsystem 300 may be implemented using any suitable combination of computing hardware and/or software. For example, some or all of the processing components of subsystem 300 may be implemented in one or more application-specific integrated circuits (ASICs), field programmable gate arrays (FPGAs), or other integrated circuit(s). As another example, subsystem 300 may include one or more memories storing instructions for implementing various components described herein, one or more hardware processors configured to execute the instructions stored in the one or more memories, and various data repositories in the one or more memories for storing data structures utilized and manipulated by the various components.

Subsystem 300 manages assignments of data units 305, such as packets 205 or portions thereof, to buffers 322a-n (collectively "buffers 322") in a buffer memory 330. Buffers 322, of which buffers 222 are an example, are subdivided into addressable locations known as entries 323. For illustrative purposes, FIG. 3 depicts some of entries 323 with a solid black fill, to indicate that the entries 323 are currently occupied by previously received data units 305. While FIG. 3 depicts an embodiment with equally-sized entries 323 and buffers 322, this is not required in other embodiments.

Subsystem 300 further includes a number of components configured to assist in managing buffer assignments. As depicted, most of these additional components are components of a traffic manager 321, of which traffic manager 221 is an example. However, the actual arrangement of the components within subsystem 300 may vary from embodiment to embodiment.

Accounting Mechanism

Subsystem 300 includes an accounting mechanism 340 configured to, among other tasks, monitor the use of buffers 322 and generate buffer state information 342 based thereon. Buffer state information 342 may include, among other information, some classification and/or quantification of a utilization state for each buffer 322. States may range from actual counts of the number of buffer entries currently available or utilized in each buffer 322, to percentages of entries available or utilized in each buffer 322, to categorizations of each buffer 322 based on comparing the foregoing to predefined thresholds (e.g. full, overutilized, normal, underutilized, empty, etc.). The buffer state information 342 may be stored in any suitable storage location, and/or communicated to other components periodically or upon request. For example, accounting mechanism 340 may report the utilization of each buffer 322 to buffer assignment logic 360 so that the buffer assignment logic may avoid, or minimize the risk of, assigning new data units 305 to buffers 322 that are already full, or close to becoming full.

In an embodiment, accounting mechanism 340 reports some or all of the buffer state information 342 on a delayed basis. Further, the data and/or events based upon which accounting mechanism 340 calculates the buffer state information 342 may exhibit some amount of delay. Hence, the buffer state information 342 may not necessarily always or ever exactly reflect the current state of the buffers 322. In an embodiment, the buffer state information 342 may in fact generally lag some number of clock cycles behind the actual state of buffers 322.

In some embodiments, for example, an accounting mechanism 340 may only report state information 342 for a given buffer 322 at intermittent times (e.g. once every ten clock cycles, once every twenty clock cycles, etc.). The accounting mechanism 340 may, for instance, determine and report updated buffer state information 342 for only a small subset of the buffers 322 each clock cycle, with the subset being chosen using a round robin approach and/or based on which buffers 322 exhibit a high level of recent activity. Alternatively, or additionally, the accounting mechanism 340 may report only the approximate utilization of a buffer 322.

Buffer Writer

Subsystem 300 includes a buffer writer 352 configured to write data units 305 to designated buffers 322. Buffer write 352 may receive a number of data units 305 to write in a given clock cycle. The exact number of data units 305 received in a given clock cycle should be no more than the number of data unit writes supported by buffer memory 300 in a given clock cycle. The number of data units 305 received in a given clock cycle may in fact be less than this amount on account of any of a variety of constraints, including both physical constraints and variations in the volume of traffic passing through subsystem 300.

Buffer writer 352 is configured to identify a buffer 322 in which to write a given data unit using buffer write order information 366 generated by buffer assignment logic 360. The buffer write order information 366 indicates an ordered list of buffers 322 that are available for write operations. Buffer writer 352 writes data units 305 to buffers 322 in the order indicated by the write order information 366. Each time a new data unit 305 arrives, it is written to the next buffer 322 in the list. For example, buffer writer 352 writes the first data unit 305 it receives in a clock cycle to the first buffer 322 in the list, the second data unit it receives in the clock cycle to the second buffer 322 in the list, and so forth. At the beginning of each new clock cycle, buffer writer 352 starts anew at the beginning of the list, whose order may change from clock cycle to clock cycle, even if buffer writer 352 did not complete the list in the previous clock cycle.

In an embodiment, buffer writer 352 may skip one or more buffers 322 in the ordered list on account of one or more eligibility criteria. For example, in some embodiments, if a buffer 322 listed in the buffer write order information 366 already has one or more scheduled operations during the current clock cycle that would conflict with a write operation (e.g. if, in a single-ported embodiment, if the buffer 322 is being read in the current clock cycle), the buffer writer 352 may "mask" the buffer 322 from the list, or otherwise mark the buffer 322, so that the write operation is not attempted.

As another example, there may be certain rules that deem a buffer 322 ineligible for the writing certain types of data under certain circumstances. In an embodiment, previous write order information 366 used in a previous cycle may render a buffer 322 ineligible for certain write operations. For instance, buffer writer 352 may be configured not to write two consecutive data units having a certain common characteristic to the same buffer 322 (e.g. two consecutive cells from the same packet). Thus, when it comes time to write the consecutive data unit, buffer writer 352 may mask the buffer 322 to which the related prior data unit was written so that the buffer 322 is not selected. Similarly, there may be a blanket rule against writing to the same buffer 322 more than a certain number of times in a certain amount of clock cycles.

Once the buffer writer 352 knows which buffer 322 to write a data unit 305 to, the buffer writer may utilize any suitable memory allocation mechanism select the location within the buffer 322 in which to write the data unit 305.

Buffer Reader

Subsystem 300 further includes a buffer reader 354 configured to read a requested buffer entry 323 and supply that entry to one or more designated processors 320. A processor 320 may be any component configured to "consume" the data within the read entry by processing that data in some manner. For instance, the processor 320 may be an egress packet processor 220b. There may be any number of processors 320 to which buffer reader 354 supplies data from buffers 322, though buffer reader 354 may not provide data to all processors 320 at the same time.

Although any suitable component may instruct buffer reader 354 to read a buffer entry 322, in an embodiment, a read scheduler 356 determines which entry or entries 323 should be read at which times. To this end, the read scheduler 356 sends data to buffer reader 354 identifying the next entry or entries 323 to read. In making this determination, read scheduler 356 uses any suitable conflict resolution and/or prioritization schemes to arbitrate between competing demands for data from the buffers 322. In an embodiment, read scheduler 356 may utilize one or more queues, such as queues 224, to determine which entry 323 to read at which time. In an embodiment, read scheduler 356 may schedule buffer reads a number of cycles in advance of the actual read operations, hence forming a schedule of upcoming read operations.

Buffer Assignment Logic

Subsystem 300 further includes buffer assignment logic 360 configured to generate the buffer write order information 366. Buffer assignment logic 360 may generate the buffer write order information 366 at different frequencies, depending on the embodiment. For instance, in some embodiments, assignment logic 360 may generate the buffer write order information 366 each clock cycle, either for immediate use by buffer writer 352 in that clock cycle, or stored for use in a future clock cycle. In other embodiments, buffer assignment logic 360 may generate the buffer write order information 366 for one or more future clock cycles every other clock cycle, every ten clock cycles, or at any other suitable frequency. In at least some embodiments, the same buffer write order information 366 may be used for more than one clock cycle in a row.

The buffer assignment logic 360 comprises two subcomponents: buffer prioritization logic 362 and buffer reprioritization logic 364. Buffer prioritization logic 362 generates a prioritized list of buffers 322 to write to based on one or more optimizing functions. Buffer prioritization logic 362 prioritizes the list, in large part, based on the current utilization states of buffers 322, as indicated by buffer state information 342. A simple optimizing function might, for instance, simply sort the buffers 322 in an order based on how full the buffers 322 are. More complex optimizing functions might include how frequently a buffer 322 has been read from over a period of time, how frequently the buffer 322 has been written to over a period of time, the type of data or flows in the buffer 322, and so forth.

In an embodiment, read operations take precedence over write operations, so as to keep processors 320 consistently utilized. This is particularly the case in embodiments where only a small number, or even one, read operation is supported in a clock cycle, so as to avoid buffer reader 354 becoming a bottleneck in the flow of data through subsystem 300. To ensure that write operations by buffer writer 352 do not block buffer reader 354 from reading from a buffer 322 that is scheduled to be read during the current clock cycle, read scheduler 356 supplies scheduling information to buffer assignment logic 360, indicating which buffer(s) 322 are to be read in upcoming cycles. Then, if a buffer 322 is to be read during a clock cycle, the prioritized list of buffers 322 and/or the final buffer write order 366 may be arranged so as to ensure that the read operation will be permitted (e.g. by removing or omitting a write operation for the buffer 366 from the prioritized list). Or, buffer writer 352 may simply be configured to skip entries that are scheduled for read operations in the current clock cycle.

In an embodiment, rather than generating a prioritized list from scratch every clock cycle, buffer prioritization logic 362 may generate an intermediate prioritized list at intervals and/or upon detecting changes in buffer state information 342. Buffer prioritization logic 362 may then generate a prioritized list for a specific clock cycle or set of clock cycles by removing entries for buffer(s) that are scheduled for read operations or otherwise unavailable in the specific cycle or cycles.

While the prioritized list generated by the buffer prioritization logic 362 could be utilized as the buffer write order 366, in at least some embodiments, utilizing the prioritized list in this manner can lead to undesirable results such as an issue known as "buffer skew." For example, consider a prioritization technique of always prioritizing the least utilized buffer. This assignment technique may result in a particular buffer 322 suddenly being assigned a large number of data units 305 in short period of time. This is particularly true if the buffer state information 342 for the particular buffer is not updated frequently, as it may take many clock cycles for the accounting mechanism 340 to determine that the particular buffer 322 is no longer under-utilized, during which clock cycles the particular buffer 322 may quickly become over-utilized. Moreover, in some embodiments there may be an increased likelihood that these data units 305 would be dequeued from the particular buffer 322 at approximately the same time as well, which in a single-ported embodiment would often render the particular buffer 322 unavailable for storing new data units 305 at that time. These events may create an undesirable feedback loop whereby buffer utilization is constantly skewed as one or more buffers repeatedly cycle between over-utilization and under-utilization.

Similarly, in some embodiments, due to delay and/or other compromises made by the accounting mechanism 340, and/or due advanced scheduling of operations, it is not always possible to make buffer assignment decisions based on real-time knowledge of exactly how full each buffer is or will be when the assignment is to be made. It is therefore possible, for example, that in the gap of time between a buffer 322 becoming full and the accounting mechanism 340 reporting that the buffer 322 is full, the buffer assignment logic 360 will cause additional assignments to be made to the buffer 322, and that as a consequence of there being no room to store the data units 305 newly assigned to the buffer 322, the data units 305 will need to be dropped.

Reprioritization Logic

To reduce occurrences of these and other problems, buffer assignment logic 360 includes buffer reprioritization logic 364. Buffer reprioritization logic 364 is configured to randomly or pseudo-randomly modify the prioritized list of buffers generated by buffer prioritization logic 362, thereby producing the final buffer write order information 366. (For simplification, throughout this disclosure, the term random shall henceforth be construed to include pseudo-random).

Generally, buffer reprioritization logic 364 operates by swapping selected sets of one or more buffers 322 within the prioritized list of buffers 322 with other sets of one or more buffers 322 within the prioritized list of buffers 322. The swapped buffers 322 may be chosen in a variety of manner, depending on the embodiment. For example, in one embodiment, the list is divided into sets of equal or approximately equal size, ordered in the same manner as the prioritized list. Each set may also be referred to as a "reprioritization set." For any given set, there is random chance that the set will be swapped with another set, such as the set that immediately precedes or follows it. The probability that a positive reordering determination is made for a given set—that is, the probability that the given set is randomly selected for swapping—may be a fixed reprioritization rate, or governed by a configurable reprioritization rate within buffer reprioritization configuration data 365, depending on the embodiment.

In some embodiments, the modification of the list may be repeated multiple times with sets of different sizes. Each repetition of the modification process is considered to be a different "reprioritization level" or "layer." For instance, a first reprioritization level may divide the list into sets of just one buffer each, a second reprioritization level may divide an intermediate list produced by the first level into sets of two or three buffers, and a third reprioritization level may divide an intermediate list produced by the second level into sets of four or five buffers. At each level, the positions of some, all, or none of the sets may be exchanged, depending on the reordering determination(s) made at that level. The third reprioritization level may then output the final write order information 366.

Any number of reprioritization levels may be used. In many embodiments, the levels may progress from those that divide the list into sets of the smallest sizes to those that divide the list into sets of the largest sizes, though this need not always be the case.

The probability of swapping a given set may differ depending on the reprioritization level. In an embodiment, for instance, buffer reprioritization data 365 may set the reprioritization rate of a first level to fifty percent, a second level to thirty percent, and a third level to ten percent. A level may be disabled entirely by setting the rate to zero percent. In many embodiments, the reprioritization rate shrinks as the sizes of the sets to be swapped increase, though again this need not always be the case.

In some embodiments, in at least one reprioritization level, each reprioritization set is paired with a set that immediately precedes or follows it. For each pair of reprioritization sets, reprioritization logic 364 independently determines whether to swap the sets in the pair. In an embodiment, each pair may itself form a reprioritization set in an immediately higher reprioritization level.

In an embodiment, reprioritization logic 364 is only configured to re-order a subset of the prioritized list of buffers 322 in some or all of the reprioritization levels. For instance, in one or more levels, only the first eight or sixteen buffers of a larger prioritized list may be subject to potential re-ordering, with the remainder of the list being unprocessed by reprioritization logic 364.

In an embodiment, buffer reprioritization logic 364 executes with the same frequency as buffer prioritization logic 362 (e.g. immediately after each prioritized list of buffers is generated). In another embodiment, buffer reprioritization logic 364 executes more frequently than buffer prioritization logic 362. For instance, buffer prioritization logic 362 may execute at a frequency chosen based on how long the buffer prioritization logic 362 takes to execute and/or the amount of time that the accounting mechanism 340 takes to refresh buffer state information 342. However, buffer prioritization logic 362 may store the prioritized list, and buffer reprioritization logic 364 may then read and process the latest list more frequently (e.g. every clock cycle), thus resulting in more frequent updates to the buffer write order data 366.

Among other effects, buffer reprioritization logic 364 more optimally balances the assignment of data units 305 to buffers 322. In certain embodiments, based in part on the more optimal buffer utilization balance achieved by the described techniques, the buffer reprioritization logic 364 may reduce the sizes and/or numbers of buffers 322 needed within a device to achieve the same effective buffering capacity of devices without buffer reprioritization logic 364. In yet other embodiments, the buffer reprioritization logic 364 also or instead reduces the number of packets that may need to be dropped due to buffer overrun in a device. In yet other embodiments, based in part on unpredictability in the reordering of the prioritized buffer list, the buffer reprioritization logic 364 renders a device less susceptible to buffer overrun attacks and/or other malicious behavior. Moreover, even in embodiments where the above effects are not necessarily realized, it may be beneficial to more equitably balance buffer utilization, as achieved by buffer reprioritization logic 364.

Figure 4:
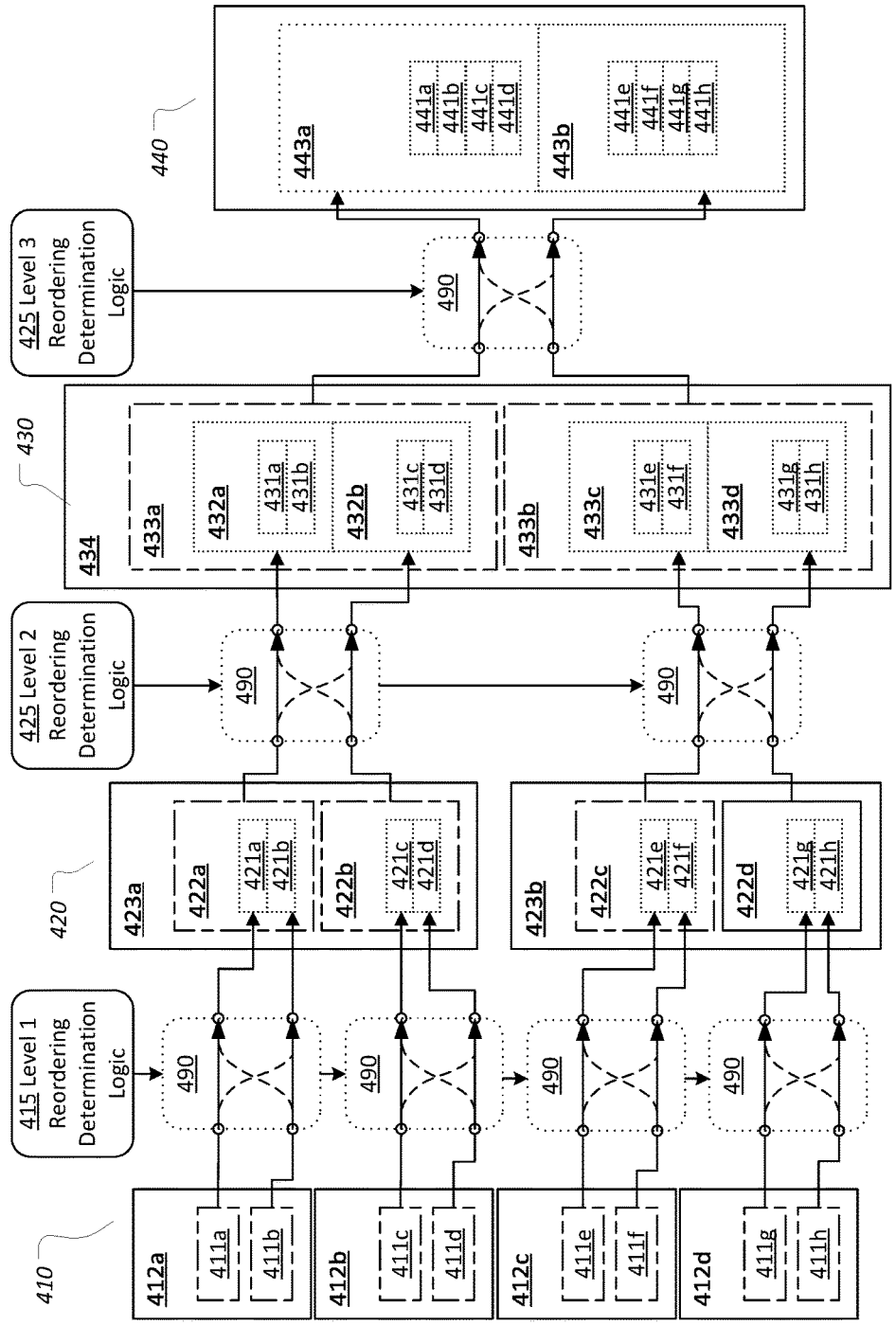
FIG. 4 illustrates example reprioritization logic for an embodiment in which eight buffers are subjected to three reprioritization levels.

FIG. 4 illustrates example reprioritization logic 400 for an embodiment in which eight buffers are subjected to three reprioritization levels, according to an embodiment. Reprioritization logic 400 is an example of reprioritization logic 364. In the depicted embodiment, reprioritization logic 400 is implemented entirely in hardware using memories interconnected via various logic components. However, reprioritization logic 400 may instead be implemented in software with a single array and various temporary structures to swap contents of array entries in each level of operation.

Buffer identifiers are initially stored in an array 410 of entries 411a-h (collectively "entries 411"). The buffers are sorted by priority, as determined using an optimizing function (e.g. by buffer prioritization logic 362). The identifier of the highest priority buffer is stored in the first entry 411 (411a), and the remaining entries 411 store buffer identifiers in decreasing order of priority. For purposes of the described reprioritization techniques, each entry 411 in this initial array 410 is considered to be its own reprioritization set.

Each of these "reprioritization sets"—i.e. each entry 411—is paired with an adjacent set—i.e. entry 411—thus forming four pairs 412a-412d (collectively "pairs 412"). Each pair 412 outputs its buffer identifiers into a different switch 490 for a first reprioritization level. Each switch 490, in turn, outputs the buffer identifiers it receives into a pair of entries 421 in an array 420 for the first reprioritization level. By default, a switch 490 is configured to output each buffer identifier into the same slot in array 420 as the buffer identifier occupied in array 410. Hence, by default, the buffer identifier for entry 411a would be outputted to entry 421a, the buffer identifier for entry 411b would be outputted to entry 421b, and so forth.

However, reordering determination logic 415 may instruct some or all of the switches 490 in the first reprioritization level to swap the order of the buffer identifiers that pass through the switch 490. Hence, for example, the buffer identifier in entry 411a would be loaded into entry 421b, while the buffer identifier in entry 411b would be loaded into entry 421a. In an embodiment, reordering determination logic 415 may be any suitable logic with a degree of randomness. For instance, reordering determining logic 415 may compare a randomly generated number to a reprioritization threshold or rate to determine whether a given switch 490 should swap its outputs. This rate may be universal, or specific to the first level reordering determining logic 415. In other embodiments, reordering determination logic 415 may utilize any other suitable means of obtaining similar results, such as rotating, over a number of clock cycles, through a set of re-ordering profiles that indicate sets to swap at, on average, the reprioritization rate.

In array 420, entries 421 are divided into reprioritization sets 422a-422d (collectively "sets 422") of two entries 421 each. In the depicted embodiment, sets 422 happen to correspond to pairs 412, though this need not always be the case. Each set 422 is paired with an adjacent set to form pairs 423a and 423b of sets 422. Each pair 423 outputs its reprioritization sets 422 into a different switch 490 for a second reprioritization level. Similar to the switches 490 in the first level, each switch 490 in the second level is configured by default to output its reprioritization sets 422 into the same locations in array 430 as they occupy in array 420. Hence, by default, the buffer identifiers in reprioritization set 422a would be outputted to the location 432a in array 430, while the buffer identifiers in reprioritization set 422b would be outputted to the location 432b in array 430.

However, reordering determination logic 425 may instruct some or all of the switches 490 in the second reprioritization level to swap the order of the reprioritization sets 422 that pass through the switch 490. Hence, for example, the buffer identifiers in reprioritization set 422a would be loaded into the location 432b, while the buffer identifiers in reprioritization set 422b would be loaded into to the location 432a. Reordering determination logic 425 for the second level may be similar in nature to that of reordering determination logic 415 for the first level, though they may have different reprioritization rates.

Note that the buffer identifiers in a given reprioritization set 422 remain in the same sequence relative to each other, regardless of whether the position of the set 422 itself changes as it passes through a switch 490. For example, if the pairing 423a is swapped such that set 422a is loaded into position 432b, the buffer identifier in entry 421a is loaded into entry 431c while the buffer identifier in entry 421b is loaded into entry 431d.

In array 430, entries 431 are divided into reprioritization sets 433a-433b (collectively "sets 433") of four entries 431 each. In the depicted embodiment, sets 433 happen to correspond to pairs 423, though this need not always be the case. The two sets 433 are paired with each other to form a single pairing 434. The two sets 433 are outputted into a common switch 490 for a third reprioritization level. Similar to the switches 490 in the first and second level, switch 490 in the third level is configured by default to output its reprioritization sets 433 into the same locations in array 440 as they occupy in array 430. Hence, by default, the buffer identifiers in reprioritization set 433a would be outputted to the location 443a in array 440, while the buffer identifiers in reprioritization set 433b would be outputted to the location 443b in array 440.

However, reordering determination logic 435 may instruct the switch 490 in the third reprioritization level to swap the order of the reprioritization sets 433 that pass through the switch 490. Hence, the buffer identifiers in reprioritization set 433a would be loaded into the location 443b, while the buffer identifiers in reprioritization set 433b would be loaded into the location 443a. Reordering determination logic 435 for the third level may be similar in nature to that of reordering determination logics 415 and 425, though they may each have different reprioritization rates.

Array 440 comprises entries 441a-h storing the same buffer identifiers as found in entries 411, though often in a different order on account of the operation of switches 490 and reordering determination logics 415/425/435. The final order of the buffer identifiers within array 440 may be directly utilized as buffer write order data.

Although three reprioritization levels are depicted in FIG. 4, it will be recognized that any number of reprioritization levels may be used, including arrangements in which the number of buffers in each reprioritization set does not necessarily double at each level, and arrangements in which the number of buffers in each reprioritization set is not always the same. Moreover, other embodiments may include fewer or additional buffers that may be reordered, necessitating fewer or additional elements in each level. The reprioritization logic may also operate on reprioritization sets that that are not pairs (e.g. triples, etc.). In such an embodiment, the reprioritization logic may exchange positions of buffers or buffer sets in accordance with a set of permutations, with each permutation having a given weight or probability.

Figure 5:
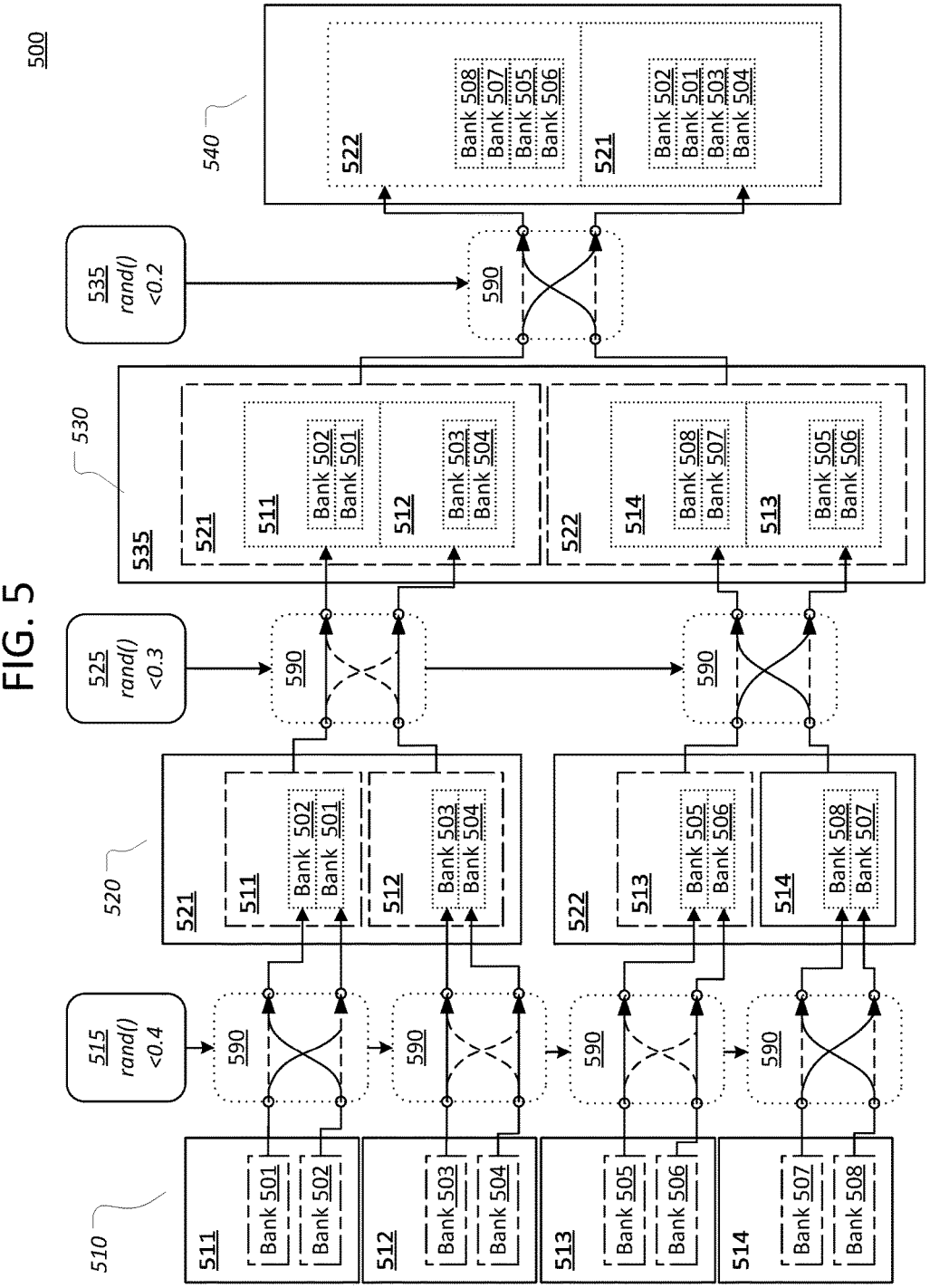
FIG. 5 illustrates an example reprioritization operation on an example ordered list of buffer banks, using the example reprioritization logic of FIG. 4.

FIG. 5 illustrates an example reprioritization operation 500 on an ordered list 510 of buffer banks 501-508, using the reprioritization logic 400. The depiction of each array entry 411/421/431/441 is modified to now show the identifier of the buffer bank stored therein. Although buffer banks 501-508 are described as "banks," they may in fact be any suitable buffer structure.

Meanwhile, the depiction of switches 590, which are the same as switches 490, are modified to illustrate whether they were instructed to swap their outputs. Reordering determination logics 515/525/535 are the same as logics 415/425/435, except modified to show an example function used to determine whether to instruct a switch to reorder its outputs. The example function is a randomization function that delivers a value between 0 and 1. The value to which the randomization function is compared is the reprioritization rate for the respective level.

Initially, banks 501-508 are sorted within array 510. As these buffer identifiers pass into the first reprioritization operation, the pairing 511, comprising banks 501 and 502, is reordered, such that in array 520, bank 502 now precedes bank 501. Likewise, pairing 514 is reordered, such that banks 508 and 507 are swapped in array 520. Pairings 512 and 513 remain unchanged, thus leaving banks 503-506 in the same position within array 520.

For the first reprioritization level, pairings 511 and 512 become reprioritization sets 511 and 512, collectively comprising the now reordered banks 501-504. These sets 511 and 512 form a pair 521. This pair 521 remains unmodified as it passes through its corresponding switch 590, thus leaving banks 501-504 in the same order (502,501,503,504) in array 530. Meanwhile, pairings 513 and 514 become reprioritization sets 513 and 514, collectively comprising the now reordered banks 505-508. These sets 513 and 514 form a pair 522. This pair 522 is reversed as it passes through its corresponding switch 590, such that set 514 now precedes set 513. The resulting order of buffer identifiers for this pair 522 within array 530 is (508,507,505,506).

For the second reprioritization level, pairings 521 and 522 become reprioritization sets 521 and 522, collectively comprising the now reordered banks 501-508. These sets 521 and 522 form a pair 535. This pair 535 is reversed as it passes through its corresponding switch 590, such that, in the third and final reprioritization level, set 522 now precedes set 521. Consequently, the final order of the banks in array 540 is (508,507,505,506,502,501,503,504).

Reprioritization Adjuster

Returning to FIG. 3, subsystem 300 may optionally further comprise a reprioritization adjuster 370. As explained above, reprioritization configuration data 365 may include reprioritization rates for each reprioritization level. Reprioritization adjuster 370 is configured to adjust these rates over time based on buffer state information 342. For instance, reprioritization adjuster 370 may raise the rate(s) (i.e. increase the likelihood of reordering) associated with one or more reprioritization level(s) as the buffers 322 become less evenly utilized, and lower the rate(s) (i.e. decrease the likelihood of reordering) as the buffers 322 become more evenly utilized. Reprioritization adjuster 370 might also or instead adjust reprioritization rates in response to other types of state data, such as data indicating an increase or decrease in total traffic, data indicating a packet drop rate, data indicating that certain flows are experiencing heavier traffic, and so forth.

In an embodiment, when the volume of data buffered is relatively small, the reprioritization rates are set relatively high so as to create a random distribution of data units amongst the buffers. As the volume starts to increase (for one or all of the buffers, depending on the embodiment), the rates gradually decrease, increasingly the likelihood that data units will be assigned to emptier buffers first. Of course, other adjustment logic is also possible.

2.8. Miscellaneous

Device 200 illustrates only one of many possible arrangements of devices configured to provide the functionality described herein. Other arrangements may include fewer, additional, or different components, and the division of work between the components may vary depending on the arrangement. For example, in an embodiment, a device 200 need not necessarily include any ingress packet processor 220, but rather packets 205 may be directed initially to the traffic manager 221. Moreover, in an embodiment, the techniques described herein may be utilized in a variety of computing contexts other than within a network 100.

Similarly, subsystem 300 illustrates only one of many possible arrangements configured to assign data units to buffers. Other arrangements may include fewer, additional, or different components, and the division of work between the components may vary depending on the arrangement. Moreover, logic 400 and operation 500 are merely illustrative examples of reprioritization logic. Such logic may, in other embodiments, divide a list into sets in different manners over a number of levels or phases. Moreover, a group of reprioritization sets whose positions are swapped may include more than two sets. For instance, the positions of three or more sets might be rotated forwards or backwards, or otherwise traded. Furthermore, in some embodiments, a reprioritization set may be any sequence or arrangement of buffers in the list, and not just consecutively ordered buffers (e.g. every second buffer, every fourth buffer, etc.).

The techniques described herein are particularly advantageous in embodiments in which buffers 322 are single-ported memories. However, the techniques may be extended to use with buffers 322 that are implemented in dual-ported memories and other memories. For instance, the determined buffer write order 366 may include an entry for each available write operation to a given buffer 322 in a given clock cycle, after taking into consideration any read operations already scheduled. Thus, for dual-ported memories, a buffer 322 might have multiple entries in the buffer write order 366, assuming the buffer 322 is not also being read from in the given clock cycle.

In an embodiment, rather than actually using a random function to select the sets to be swapped, similar results may be achieved by rotating through different re-ordering profiles, whereby a different re-ordering operation profile is used to re-order the prioritized list for each clock cycle of a plurality of profiles. Each profile rearranges the list in different manners (e.g. swapping the first and fifth buffer, swapping the last half of the list with the first half of the list, etc.). A set of profiles may be configured such that, on average, a certain number of buffers are re-ordered each clock cycle. The larger the number of profiles that can be rotated through, the closer this approach comes to emulating a random function.

3.0. Functional Overview

The various elements of the process flows described below may be performed in a variety of systems, including in device 200 and/or subsystem 300 described above. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Writing Data Units to Buffers

Figure 6:
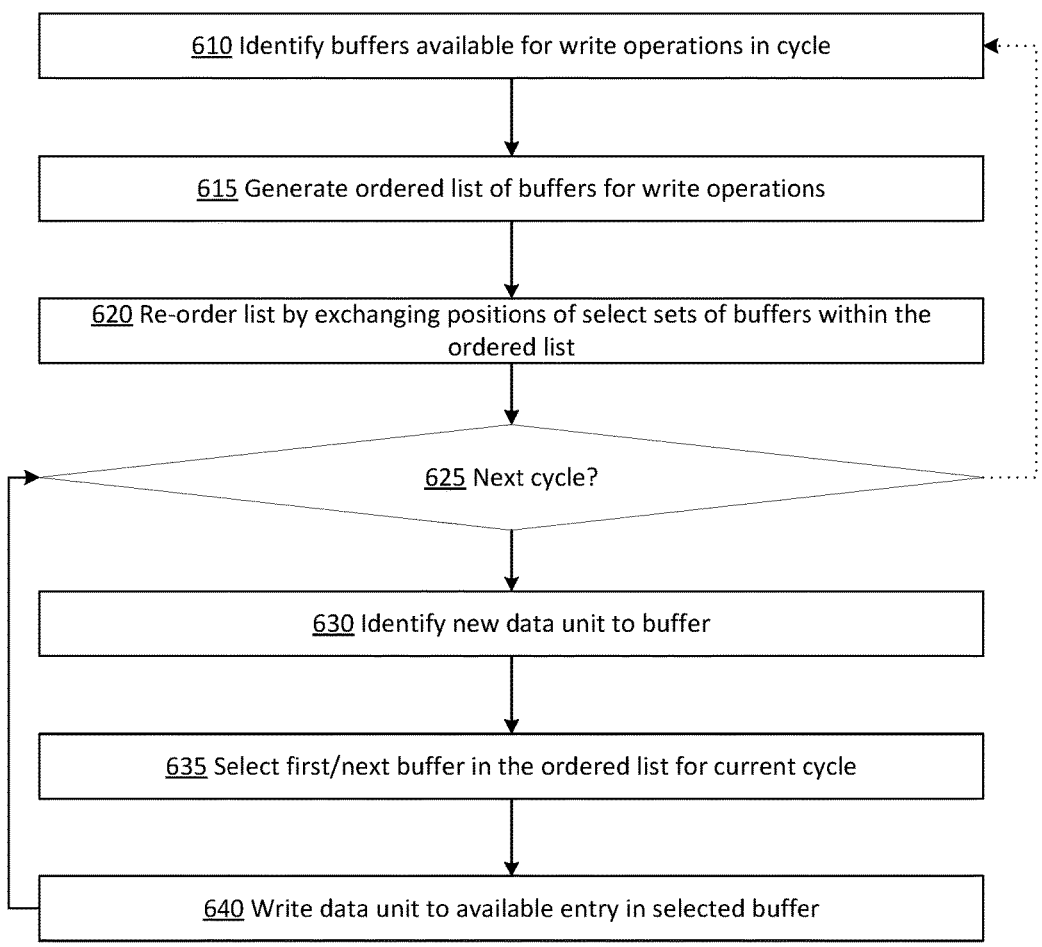
FIG. 6 illustrates an example flow for writing data units to buffers.

FIG. 6 illustrates an example flow 600 for writing data units to buffers, according to an embodiment. Block 610 comprises identifying buffers, such as buffers 222 or 322, that are available for write operations in a current clock cycle, or in one or more upcoming clock cycle(s). In some embodiments, this may be a trivial step, in that all buffers are available for write operations. In an embodiment, block 610 may comprise identifying one or more buffers scheduled for read operations in the relevant clock cycle(s). In such an embodiment, these buffers may be deemed unavailable for write operations (e.g. if the buffers are implemented in a single-ported memory, and read operations take precedence). In an embodiment, block 610 may comprise identifying buffers that are unavailable on account of being full or in an otherwise unusable state.

Block 615 comprises generating an ordered list of buffers that are available for write operations, sorted in accordance to some prioritization scheme. The prioritization scheme may, for instance, involve weighting each buffer by one or more factors, such as current fill levels, current state information, or other information such as described herein. The buffers may then be sorted by their weights (e.g. so that the buffer that is least filled or otherwise of highest priority is first in the list). Not all available buffers need be in the list, depending on the embodiment.

Block 620 comprises re-ordering the list by swapping the positions of sets of buffers within the ordered list. A set of buffers may include one or more buffers. In an embodiment, each set is a sequence of buffers within the list. In an embodiment, each set is a set of one or more consecutively ordered buffers within the list. In an embodiment, each swapped set is swapped with another set that is adjacent to it (e.g. before or after) within the list. In an embodiment, the swapping may occur by iterating over the list in one or more levels or phases, each time swapping sets of increasingly larger size. For example, in an embodiment, the sets of buffers may include some or all of reprioritization sets 411, 422, and/or 433 from FIG. 4.

In an embodiment, the determination of which sets of buffers are to be swapped is made randomly or pseudo-randomly. For example, the determination may be made by comparing a reprioritization rate (e.g. a percentage of sets that should be swapped) with a randomly generated number. In an embodiment, the reprioritization rate (or other factors that affect the determination to swap a group of buffer sets) may vary depending on a variety of factors, such as the sizes of the sets, current buffer states, aggregate buffer states, buffer fill levels, the rate at which a buffer is being filled or emptied, and so forth. For instance, in an embodiment, the larger a set, the less likely that the set will be swapped with another set. In some clock cycles, it may be determined not to swap any sets of buffers, in which case block 620 is omitted.

Further example techniques for performing block 620 are described elsewhere in the disclosure.

Block 625 comprises determining whether a next clock cycle has arrived. If so, depending on the embodiment, flow 600 may return to block 610 for identifying a new ordered list of buffers. Otherwise, flow 600 may proceed to block 630, which comprises identifying a new data unit, such as a data unit 305, to store in a buffer.

Block 635 comprises consulting the ordered list of buffers that was generated for the current clock cycle (e.g. in this iteration, or a previous iteration, of flow 600), and selecting the next eligible buffer in that list as the buffer in which to store the new data unit. If this is the first iteration of blocks 630-640 in this clock cycle, the next eligible buffer in the list may be, for instance, the first buffer in the list. Otherwise, the next eligible buffer may be the buffer at the index within the list that immediately follows that of the last buffer selected this clock cycle.

In an embodiment, rather than serving as a fixed buffer write order, the ordered list serves as a guide for selecting which buffer to write to. This list may not necessarily take into account, for example, buffer(s) that will be precluded from write operations on account of higher-priority read operations. As discussed elsewhere, the write process may ignore or mask buffers in the list that are deemed ineligible for writing for this or other reasons.

Block 640 comprises writing the data unit to an available entry within the selected buffer. Any suitable technique for choosing an available entry in the selected buffer may be utilized. From block 640, flow 600 returns back to block 625.

Flow 600 illustrates only one of many possible flows for writing a data unit. Other flows may include fewer, additional, or different elements, in varying arrangements.

3.2. Determining a Buffer Write Order for Example Buffer List

Figure 7:
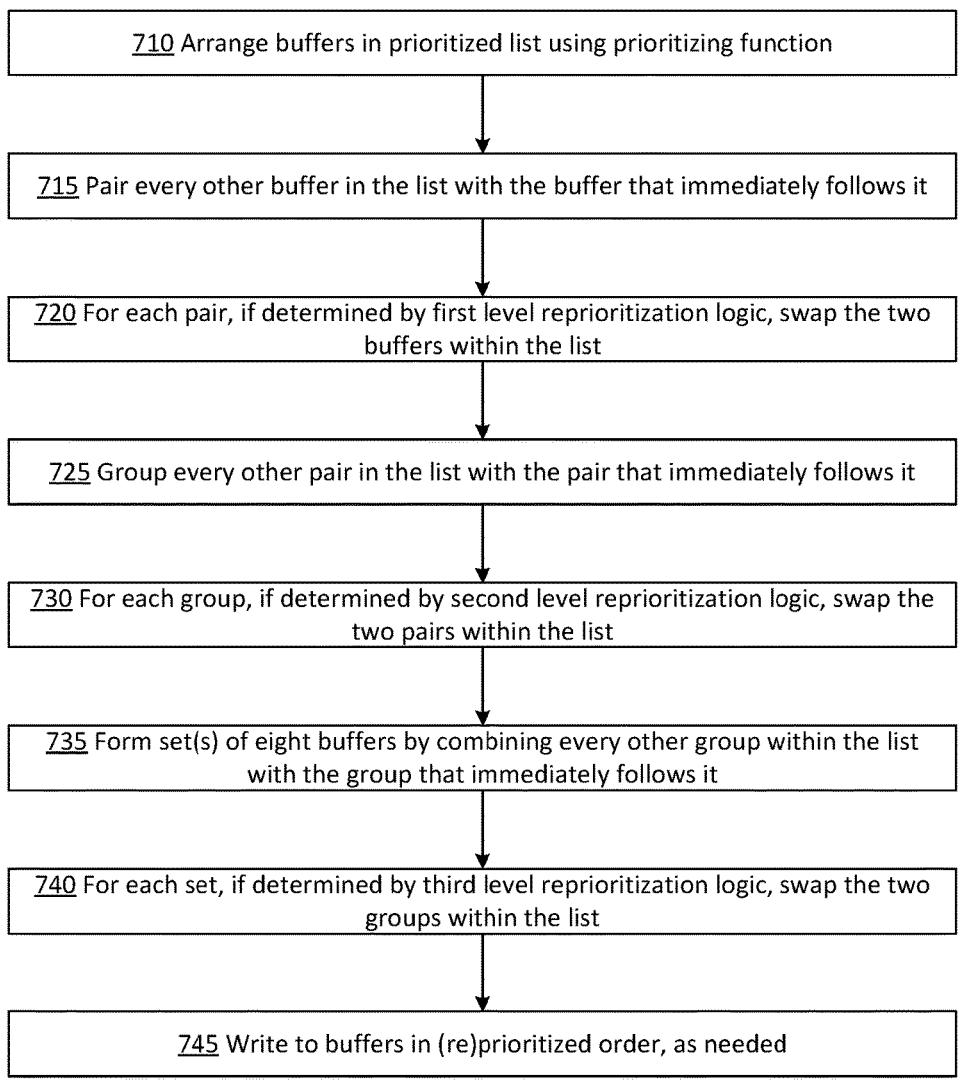
FIG. 7 illustrates an example flow for determining a buffer write order for an example buffer list whose size is eight, or a multiple thereof.

FIG. 7 illustrates an example flow 700 for determining a buffer write order for an example buffer list whose size is eight, or a multiple thereof, according to an embodiment. Flow 700 may be implemented by, for example, logic 400 while performing an operation similar to operation 500. Flow 700 may also or instead be implemented in the course of performing step 620 of flow 600. Flow 700 may also be implemented in a variety of other contexts.

Block 710 comprises arranging buffers, such as buffers 222 or 322, in a prioritized list using a prioritizing function. Any suitable prioritizing function may be utilized. In an embodiment, the function is based at least on how full the buffers are. For instance, the prioritizing function may sort the buffers from lowest to highest buffer utilization count or percentage. Or, the prioritizing function may sort the buffers by a buffer utilization state, such as under-utilized, normal, and over-utilized. Other examples of suitable factors for a prioritizing function are described elsewhere in this disclosure.

In an embodiment, the list is only of buffers that are available for a write operation. For instance, before or after the prioritizing function, buffers that would be precluded from the write operation because they are being utilized for other purposes (e.g. for a read operation or other reasons) may be filtered from the list. In an embodiment supporting more than one write per cycle, there may be multiple instances of each buffer in the list, and each write operation to each buffer may be assigned a different priority. One or more of the slots for the buffer may be removed from the list as needed for availability purposes.

Block 715 comprises pairing every other buffer in the list with the buffer that immediately follows it. For instance, the first and second buffers would be paired together, the third and fourth buffers would be paired together, and so forth.

Block 720 comprises, for each pair, if determined by first level reprioritization logic, swapping the two buffers within the list. The first level reprioritization logic may include, for instance, a random element that causes the buffers in a pair to be swapped, on average, at a certain reprioritization rate. The reprioritization rate may be specific to the first level. The reprioritization rate may further vary over time and/or based on the identities of the buffers. Other example features of suitable logic for making a re-ordering determination are described elsewhere in the disclosure.

When the first level reprioritization logic indicates to swap the two buffers in a pair, the positions of the buffers are exchanged in the list without otherwise changing the list. Thus, for example, if the prioritization logic does not determine to swap the buffers in the first pair and third pair, but does determine to swap the buffers in the second pair, the list would continue to begin with the first and second buffer in the list, but then proceed with the buffer that was previously fourth in the list followed by the buffer that was previously third in the list, and then proceed with the buffers that were fifth and sixth in the list.

Block 725 comprises grouping every other pair in the list with the pair that immediately follows it. This grouping occurs with respect to the list as modified per block 720, as opposed to the initial list. For example, the pair comprising the first and second buffers in the list (potentially swapped as a result of block 720) would be grouped with the pair comprising the third and fourth buffers in the list (again, potentially swapped as a result of block 720).

Block 730 comprises, for each group, if determined by second level reprioritization logic, swapping the two pairs within the list. The second level reprioritization logic may be similar to that of the first level. However, in an embodiment, the logic causes pairs to be swapped at a different rate than the rate at which the first level caused the individual buffers to be swapped.

When the second level reprioritization logic indicates to swap the two pairs of buffers in a group, the positions of the pairs are exchanged in the list without otherwise changing the list or the order of the buffers within the pairings. For instance, continuing with the example given with respect to block 720, if the first and second pairs in the list are now to be swapped, the resulting list would begin with the second pair (comprising, on account of its constituent buffers having been swapped previously, the buffer that was initially fourth in the list followed by the buffer that was initially third in the list) followed by the first pair (comprising the buffer that was initially first in the list followed by the buffer that was initially second in the list), and then followed by the third pair (comprising the buffer that was initially fifth in the list followed by the buffer that was initially sixth in the list).

Block 735 comprises forming one or more sets of eight buffers by combining every other group within the list with the group that immediately follows it. The sets are formed with respect to the list as modified per block 730, as opposed to the initial list. For example, the first set would contain the group of buffers comprising the first through fourth buffers in the list (potentially re-ordered as a result of block 730) along with the group of buffers comprising the fifth through eighth buffers in the list (again, potentially re-ordered as a result of block 730).

Block 740 comprises, for each set, if determined by third level reprioritization logic, swapping the two groups within the list. Again, the third level reprioritization logic may be similar to that of the first and second levels. However, in an embodiment, the logic causes the groups to be swapped at a different rate than the rate(s) at which the first and/or second levels caused the individual buffers and/or pairs to be swapped.

When the third level reprioritization logic indicates to swap the two groups of buffers in a set, the positions of the groups are exchanged in the list without otherwise changing the list or the order of the buffers within the group. For instance, continuing with the example given with respect to block 730, if the first and second groups in the list are now to be swapped, the resulting list would begin with the second group (comprising, if no buffers in the second group were previously swapped, the buffers previously at positions five through eight of the initial list) followed by the first group (comprising, in order, the buffers originally in positions four, three, one, and two of the initial list).

At the end of block 740, the "re-ordering" or "reprioritizing" of the prioritized list is considered complete. Block 745 thus comprises writing to buffers in an order now indicated by the list, as needed. Not all buffers need be written to. Rather, whenever a write operation is needed to buffer new data (e.g. new data units), the next eligible buffer in the list is selected to store the new data. Buffers that have already been written to are removed from the top of the list or otherwise marked or indicated as unavailable. In an embodiment, certain buffers in the list may be deemed ineligible for writing and thus ignored from the selection process. Block 745 concludes after some defined period of time, such as a clock cycle, after which the list is reset or discarded, regardless of whether the list has been exhausted.

Flow 700 may be repeated any number of times. For example, flow 700 may be repeated each clock cycle. In an embodiment, where the write order for a given cycle is scheduled in advance, blocks 710-740 may be performed each clock cycle, and the write order information generated thereby stored for subsequent use. Block 745 may also be performed each clock cycle, but with respect to write order information that was previously generated and stored for the current cycle. Of course, other variations are also possible, such as performing the prioritizing function of block 710 on an infrequent basis (e.g. once every ten cycles) and storing the results as an intermediate list. When it then comes time to generate the prioritized list for each individual cycle, the list may be derived from the intermediate list by removing the scheduled read buffer(s) for that cycle from the intermediate list. Or, block 745 may be configured to ignore buffers in the final list that have been scheduled for read operations.

Flow 700 illustrates only one of many possible flows for determining a buffer write order. Other flows may include fewer, additional, or different elements, in varying arrangements. While flow 700 operates directly on a list where the number of buffers is a multiple of eight buffers, it will be noted that flow 700 may be utilized in embodiments where the number of buffers is not a multiple of eight. For example, flow 700 may be utilized in a nine-buffer or seventeen-buffer embodiment where one buffer is reserved for a read operation every clock cycle, and thus not included in the list. Or, flow 700 may be utilized in an embodiment having any number of buffers, where the list is actually only a sublist of the available buffers (e.g. the first eight, sixteen, twenty-four, etc. buffers). Moreover, flow 700 may easily be modified for other numbers of buffers by adding additional levels of reprioritization logic and/or removing levels of reprioritization logic.

It should further be noted that, in at least some instances, it will be determined not to re-order any buffers in blocks 720, 730, and/or 740. In an embodiment, any of the levels of reprioritization (i.e. blocks 720, 730, and 740) may be disabled by setting the reprioritization rate to zero.

3.3. Determining a Buffer Write Order, Generally

Figure 8:
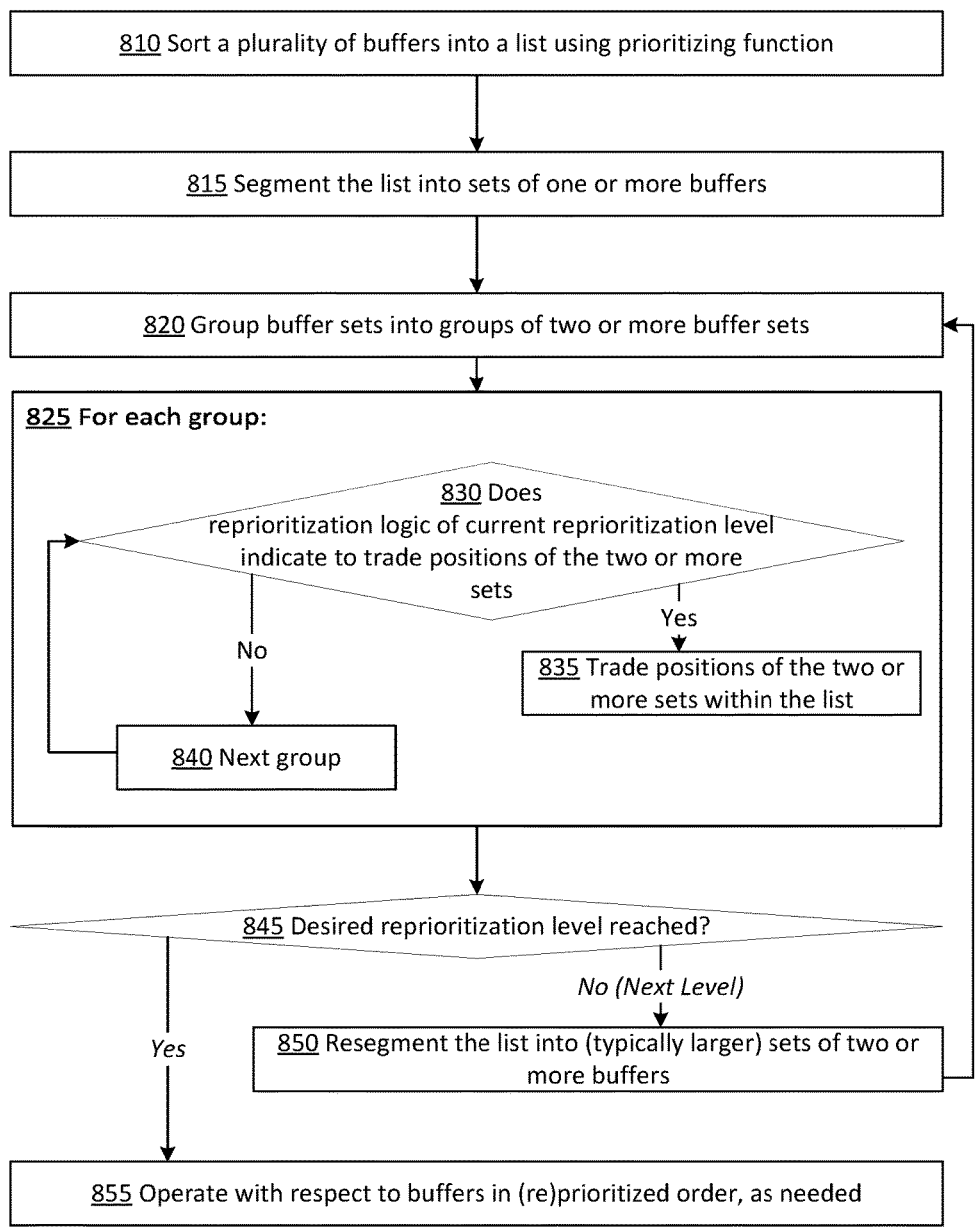
FIG. 8 illustrates an example flow for determining a buffer write order generally.

FIG. 8 illustrates an example flow 800 for determining a buffer write order generally, according to an embodiment. Flow 800 may be utilized for any number of buffers and reprioritization levels. Flow 800 may be implemented by, for example, logic 400 while performing an operation similar to operation 500. Flow 800 may also or instead be implemented in the course of performing step 620 of flow 600.

Flow 800 may also be implemented in a variety of other contexts. In an embodiment, flow 700 is a specific implementation of flow 800.

Block 810 comprises sorting a plurality of buffers into a list using prioritizing function, in similar manner as described with respect to block 710.

Block 815 comprises segmenting the list into sets of one or more buffers. Such sets are elsewhere referred to as "reprioritization sets," in that the priority of the set within the list will be subject to possible "reprioritization" or "re-ordering." The sets may be of any suitable size. For instance, each buffer may constitute a set. Or, a set may comprise two or more buffers. In some embodiments, each set comprises the same amount of buffers, while in other embodiments, sets may have different numbers of buffers. In an embodiment, the size of the set is a function of a current level of reprioritization.

Block 820 comprises grouping the sets of one or more buffers, or "buffer sets," into groups of two or more buffer sets. Though any two sets may be grouped together, in an embodiment only adjacent sets within the list are grouped together. That is, if there are three sets in a group, the first three sets within list are grouped together, followed by the next three sets, and so forth.

Block 825 comprises iteratively evaluating each group to determine whether to trade the positions of its constituent sets. Per sub-block 830, this comprises, for each group, determining whether the reprioritization logic of current reprioritization level makes a positive reordering determination to trade positions of the two or more sets. This determination may proceed in any suitable manner, such as explained with respect to the reprioritization logic in blocks 720, 730, and 740. Again, the reprioritization logic may vary depending on the current reprioritization level.

For those groups with a positive determination in sub-block 830, sub-block 835 comprises trading positions of the two or more sets within the list. For groups with only two sets, the positions of the sets are swapped. For groups of more than two sets, the positions may be traded in any suitable manner (e.g. a rotation, shift, etc.). The order of buffer(s) within the sets does not change, and continues to reflect any reordering that has already occurred within the sets.

For those groups with a negative determination in sub-block 830 (i.e. it was determined not to re-order the sets within the group), sub-block 840 comprises iterating to the next group and returning back to block 830.

Block 845 comprises, once each group has been evaluated, determining whether the desired reprioritization level has been reached. That is, for example, if it is desired to iterate through the list three times for re-ordering purposes, it is determined whether this is already the third time through the list.

If not, flow proceeds to block 850, in which the next reprioritization level begins. Otherwise, flow proceeds to block 855. In some embodiments, the number of reprioritization levels is hard-coded, and thus an explicit determination may not necessarily be made. Rather, flow 800 may simply proceed to the next level if additional levels remain.

Block 850 comprises re-segmenting the list into new sets of two or more buffers. These sets will be different, and typically larger, than those of block 815 (or the previous iteration of 850, if applicable). In an embodiment, each set in block 850 was a group formed in the immediately preceding execution of block 820. Of course, other arrangements are also possible. The list that is re-segmented is the list after any modifications that may have resulted from performance of sub-block 835. From block 850, flow returns to block 820, but with respect to the new reprioritization sets of this next reprioritization level.

Block 855 comprises, once all of the reprioritization levels have been performed, performing operations with respect to the buffers in an order now indicated by the list, as potentially modified. Any suitable operation that involves access to the buffer may be performed, including read and/or write operations. As with block 745, not all buffers in the list need be accessed if less than the maximum number of operations are needed in the relevant period of time for which the list was generated. Rather, at the end of the period, the list is reset or discarded. In an embodiment, certain buffers in the list may be deemed ineligible for the operation, and thus ignored from the selection process.

As with flow 700, flow 800 may be repeated any number of times. For example, flow 800 may be repeated each clock cycle. In an embodiment, where the write order for a given cycle is scheduled in advance, blocks 810-840 may be performed each clock cycle, and the write order information generated thereby stored for subsequent use. Block 855 may also be performed each clock cycle, but with respect to write order information that was previously generated and stored for the current clock cycle. Of course, other variations are also possible, such as performing the prioritizing function of block 810 on an infrequent basis (e.g. once every ten cycles) and storing the results as an intermediate list. When it then comes time to generate the prioritized list for each individual cycle, the prioritized list may be derived from the intermediate list by removing the scheduled read buffer(s) for that cycle from the intermediate list. Or, block 855 may be configured to ignore buffers in the final list that have been scheduled for read operations.

Flow 800 illustrates only one of many possible flows for determining a buffer write order. Other flows may include fewer, additional, or different elements, in varying arrangements.

4.0. Example Embodiments

Examples of some embodiments are represented, without limitation, in the following clauses:

According to an embodiment, a system comprises: one or more data unit processors configured to process data units; a plurality of buffers comprising entries configured to store the data units as the data units await processing by the one or more data unit processors; an accounting component configured to generate buffer state information indicating levels of utilization for the buffers; prioritization logic configured to generate an ordered list of the buffers sorted based at least partially on the indicated levels of utilization; reprioritization logic configured to modify the ordered list by reordering sets of one or more buffers within the ordered list through exchanging positions of the sets within the ordered list, the reprioritization logic varying the sets selected for reordering between defined time periods; and a buffer writer configured to write the data units to the buffers as the data units are received, the buffer writer selecting which of the buffers to write particular data units to in an order indicated by the modified ordered list.

In an embodiment, the system further comprises: a plurality of network interfaces for receiving the data units, the data units being network packets or portions thereof; wherein the one or more data unit processors are packet processors configured to determine how or whether to forward the network packets to one or more destinations; wherein the system is a network switch or router.

In an embodiment, the buffer writer is configured to begin selecting buffers at the top of the modified ordered list at the start of each of the defined time periods, without necessarily having written to each of the buffers in the modified ordered list an immediately previous defined time period, the buffer writer further configured to skip selecting one or more buffers in the modified ordered list that are deemed ineligible for writing.

In an embodiment, the defined time period is a clock cycle.

In an embodiment, the reprioritization logic is configured to vary the sets selected for reordering between defined time periods by segmenting the ordered list into a defined plurality of sets and randomly selecting the sets to be reordered from the plurality, at one or more defined reprioritization rates.

In an embodiment, the reprioritization logic is configured to utilize multiple reprioritization levels to select the sets for reordering, the ordered list segmented into different candidate sets at each reprioritization level, the candidate sets being of a different sizes for different reprioritization levels, the sets to be reordered being selected from the candidate sets, the average percentage of the sets selected for reordering, over time, differing for each of the reprioritization levels.

In an embodiment, the candidate sets increase in size with the reprioritization levels, wherein the average percentage of the sets selected decreases with the reprioritization levels.

In an embodiment, the reprioritization logic comprises a first reprioritization level in which adjacent sets of individual buffers in the ordered list are configured to be exchanged at a first reprioritization rate, a second reprioritization level in which adjacent sets of buffer pairs in the list produced by the first reprioritization level are configured to be exchanged at a second reprioritization rate, and a third reprioritization level in which adjacent sets of four buffers in the list produced by the second reprioritization level are configured to be exchanged at a third reprioritization rate.

In an embodiment, the reprioritization logic comprises a plurality of memory arrays corresponding to different reprioritization levels, the memory arrays configured to store the ordered list or a modified version thereof, the reprioritization logic further comprising switches configured to route data from slots in one array to slots in another array based on reordering determination logic for the corresponding reprioritization level.

In an embodiment, the accounting component is configured to, in a given defined time period, update the buffer state information for only a subset of the buffers, the subset being less than all of the buffers.

In an embodiment, the system further comprises: a read scheduler configured to schedule buffer read operations to read data units from the buffers; a buffer reader configured to read data units from the buffers in accordance to the scheduling and provide the read data units to the one or more data unit processors; wherein the buffer prioritization logic is configured to prioritize the scheduled read operations by ensuring that the ordered list generated for a given time period does not block any read operation scheduled by the read scheduler for the given time period.

In an embodiment, each of the buffers is a single-ported memory bank.

In an embodiment, the prioritization logic sorts the ordered list in order of increasing buffer utilization, such that the least utilized buffer is indicated to be the first buffer to be written to.

In an embodiment, the system further comprises: a reprioritization adjuster configured to adjust rates at which the sets are selected for re-ordering based at least partially on the buffer state information.

According to an embodiment, a method comprises: identifying buffers available for a particular type of operation in a defined time period; generating a prioritized list of the buffers from which to select particular buffers to assign to the particular type of operation in the defined time period; re-ordering the prioritized list by exchanging positions of sets of one or more buffers within the ordered list; and, starting at a beginning of the re-ordered prioritized list, whenever the particular type of operation is needed during the defined time period, assigning a next eligible buffer in the re-ordered prioritized list for performing the particular type of operation.

In an embodiment, a different buffer is assigned each time the operation is performed in the defined time period, the assigned buffer having an index in the re-ordered list that corresponds to the number of times the operation has been performed in the defined time period.

In an embodiment, the particular type of operation is storing a data unit within a buffer, each buffer being accessible only a limited number of times in the defined time period.

In an embodiment, each buffer is a single-ported memory and the limited number of times is one.

In an embodiment, the method further comprises: calculating buffer state information for the buffers, the buffer state information calculated at a lower frequency than that of the defined time period, wherein the defined time period is a particular clock cycle, wherein generating the prioritized list of buffers comprises sorting the prioritized list of buffers based at least partially on the buffer state information.

In an embodiment, identifying the available buffers comprises identifying a first buffer that is scheduled for a read operation during the defined time period as being unavailable.

In an embodiment, the method further comprises: identifying a first buffer that is scheduled for a read operation during the defined time period, and skipping the first buffer or omitting the first buffer from the re-ordered prioritized list.

In an embodiment, re-ordering the prioritized list comprises: segmenting the re-ordered prioritized list into candidate sets of one or more buffers; grouping the candidate sets into groups of two or more candidate sets; for each group, when reprioritization logic indicates to re-order the group, trading positions of the two or more candidate sets within the re-ordered prioritized list.

In an embodiment, the reprioritization logic is at least partially random and configured to indicate that a specified percentage of groups be re-ordered over a plurality of time periods.

In an embodiment, re-ordering the prioritized list comprises a plurality of iterations of: segmenting the re-ordered prioritized list into candidate sets of one or more buffers; grouping the candidate sets into groups of two or more candidate sets; for each group, when reprioritization logic indicates to re-order the group, trading positions of the two or more candidate sets within the re-ordered prioritized list; wherein in each of the iterations the candidate sets are of different sizes.

In an embodiment, in each of the iterations, the candidate sets are of increasingly greater size.

In an embodiment, in each of the iterations, the reprioritization logic is configured to indicate that a decreasingly smaller percentage of groups be re-ordered over a plurality of time periods.

In an embodiment, each of the candidate sets is a set of consecutively ordered buffers in the prioritized list, as potentially modified in any previous iteration.

In an embodiment, the candidate sets in each group are adjacent to each other in the prioritized list, as potentially modified in any previous iteration.

In an embodiment, the method further comprises: adjusting one or more rates at which the sets of one or more buffers are selected for re-ordering over multiple defined time periods based on changes to buffer state information.

In an embodiment, re-ordering the prioritized list comprises: generating a first re-ordered prioritized list by randomly exchanging positions of adjacent buffers in the prioritized list; generating a second re-ordered prioritized list by randomly exchanging positions of adjacent pairs of buffers in the first re-ordered prioritized list.

In an embodiment, the method further comprises: generating a third re-ordered prioritized list by randomly exchanging positions of adjacent groups of four buffers in the second re-ordered prioritized list.

In an embodiment, the re-ordered prioritized list is the third re-ordered prioritized list.

In an embodiment, generating the first, second, and third re-ordered prioritized lists involve randomly exchanging positions of sets of one or more buffers at different rates depending on which list is being generated.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 9:
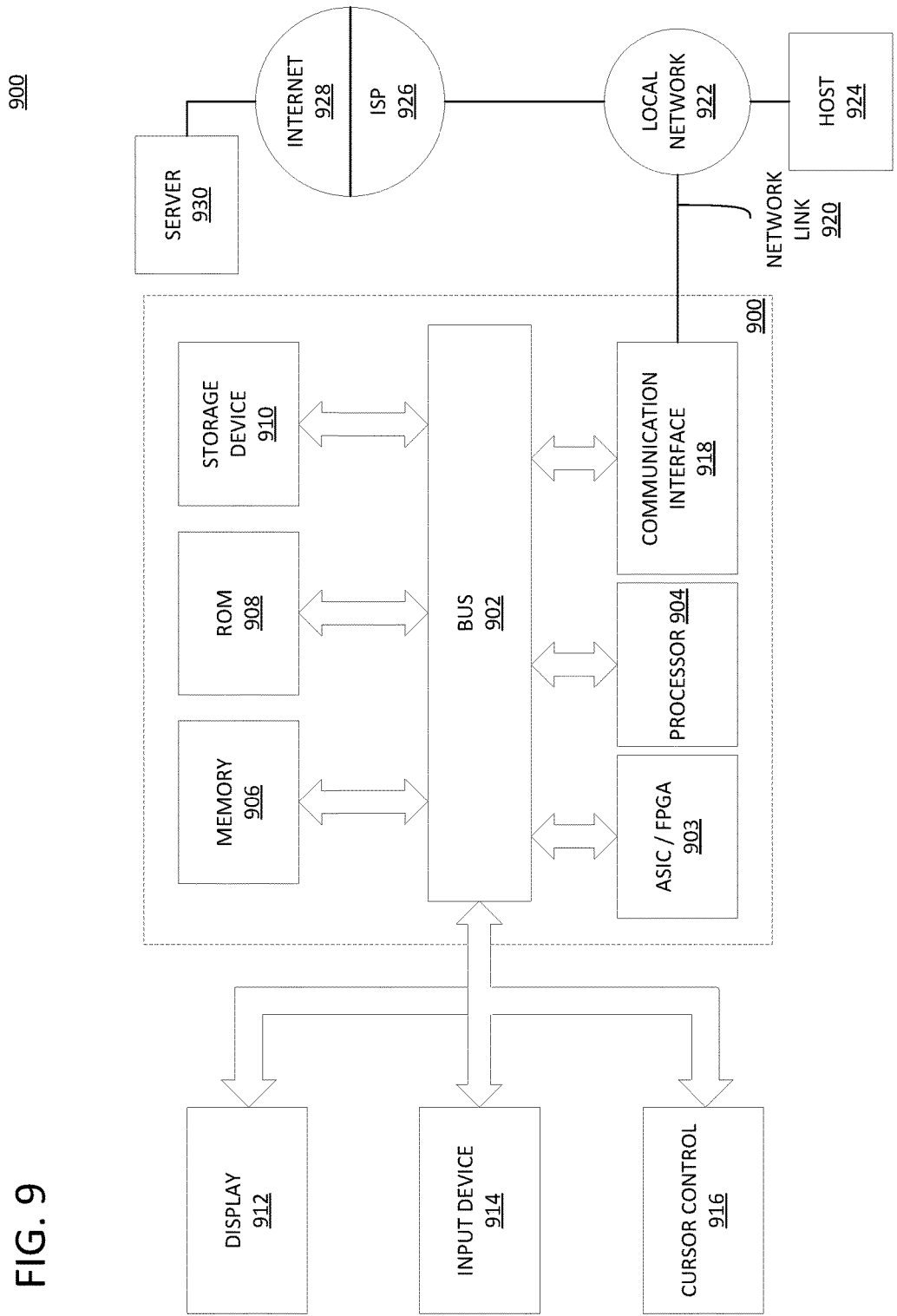
FIG. 9 is block diagram of a computer system upon which embodiments of the inventive subject matter may be implemented.

FIG. 9 is a block diagram that illustrates a computer system 900 that may be utilized in implementing the above-described techniques, according to an embodiment. Computer system 900 may be, for example, a desktop computing device, laptop computing device, tablet, smartphone, server appliance, computing mainframe, multimedia device, handheld device, networking apparatus, or any other suitable device. In an embodiment, FIG. 9 and FIG. 2 are both different views of a same networking device. In an embodiment, FIG. 9 and FIG. 3 are both different views of a same computing device.

Computer system 900 may include one or more ASICs, FPGAs, or other specialized circuitry 903 for implementing program logic as described herein. For example, circuitry 903 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 900 may include one or more hardware processors 904 configured to execute software-based instructions. Computer system 900 may also include one or more busses 902 or other communication mechanism for communicating information. Busses 902 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 900 also includes one or more memories 906, such as a RAM, hardware registers, or other dynamic or volatile storage device for storing data units to be processed by the one or more ASICs, FPGAs, or other specialized circuitry 903. Memory 906 may also or instead be used for storing information and instructions to be executed by processor 904. Memory 906 may be directly connected or embedded within circuitry 903 or a processor 904. Or, memory 906 may be coupled to and accessed via bus 902. Memory 906 also may be used for storing temporary variables, data units describing rules or policies, or other intermediate information during execution of program logic or instructions.

Computer system 900 further includes one or more read only memories (ROM) 908 or other static storage devices coupled to bus 902 for storing static information and instructions for processor 904. One or more storage devices 910, such as a solid-state drive (SSD), magnetic disk, optical disk, or other suitable non-volatile storage device, may optionally be provided and coupled to bus 902 for storing information and instructions.

A computer system 900 may also include, in an embodiment, one or more communication interfaces 918 coupled to bus 902. A communication interface 918 provides a data communication coupling, typically two-way, to a network link 920 that is connected to a local network 922. For example, a communication interface 918 may be an integrated services digital network (ISDN) card, cable modem, satellite modem, or a modem to provide a data communication connection to a corresponding type of telephone line. As another example, the one or more communication interfaces 918 may include a local area network (LAN) card to provide a data communication connection to a compatible LAN. As yet another example, the one or more communication interfaces 918 may include a wireless network interface controller, such as a 902.11-based controller, Bluetooth controller, Long Term Evolution (LTE) modem, and/or other types of wireless interfaces. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by a Service Provider 926. Service Provider 926, which may for example be an Internet Service Provider (ISP), in turn provides data communication services through a wide area network, such as the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

In an embodiment, computer system 900 can send packets and receive data through the network(s), network link 920, and communication interface 918. In some embodiments, this data may be data units that the computer system 900 has been asked to process and, if necessary, redirect to other computer systems via a suitable network link 920. In other embodiments, this data may be instructions for implementing various processes related to the described techniques. For instance, in the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution. As another example, information received via a network link 920 may be interpreted and/or processed by a software component of the computer system 900, such as a web browser, application, or server, which in turn issues instructions based thereon to a processor 904, possibly via an operating system and/or other intermediate layers of software components.

Computer system 900 may optionally be coupled via bus 902 to one or more displays 912 for presenting information to a computer user. For instance, computer system 900 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 912 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 912.

One or more input devices 914 are optionally coupled to bus 902 for communicating information and command selections to processor 904. One example of an input device 914 is a keyboard, including alphanumeric and other keys. Another type of user input device 914 is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Yet other examples of suitable input devices 914 include a touch-screen panel affixed to a display 912, cameras, microphones, accelerometers, motion detectors, and/or other sensors. In an embodiment, a network-based input device 914 may be utilized. In such an embodiment, user input and/or other information or commands may be relayed via routers and/or switches on a Local Area Network (LAN) or other suitable shared network, or via a peer-to-peer network, from the input device 914 to a network link 920 on the computer system 900.

As discussed, computer system 900 may implement techniques described herein using customized hard-wired logic, one or more ASICs or FPGAs 903, firmware and/or program logic, which in combination with the computer system causes or programs computer system 900 to be a special-purpose machine. According to one embodiment, however, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 900 can receive the data on the network and demodulate the signal to decode the transmitted instructions. Appropriate circuitry can then place the data on bus 902. Bus 902 carries the data to main memory 906, from which processor 904 retrieves and executes the instructions. The instructions received by main memory 906 may optionally be stored on storage device 910 either before or after execution by processor 904.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
   one or more data unit processors configured to process data units;
   a plurality of buffers comprising entries configured to store the data units as the data units await processing by the one or more data unit processors;
   an accounting component configured to generate buffer state information indicating levels of utilization for the buffers;
   prioritization logic configured to generate an ordered list of the buffers sorted based at least partially on the indicated levels of utilization;
   reprioritization logic configured to modify the ordered list by reordering sets of one or more buffers within the ordered list through exchanging positions of the sets within the ordered list, the reprioritization logic varying the sets selected for reordering between defined time periods;
   a buffer writer configured to write the data units to the buffers as the data units are received, the buffer writer selecting which of the buffers to write particular data units to in an order indicated by the modified ordered list.

2. The system of claim 1, further comprising:
   a plurality of network interfaces for receiving the data units, the data units being network packets or portions thereof;
   wherein the one or more data unit processors are packet processors configured to determine how or whether to forward the network packets to one or more destinations;
   wherein the system is a network switch or router.

3. The system of claim 1, wherein the buffer writer is configured to begin selecting buffers at the top of the modified ordered list at the start of each of the defined time periods, without necessarily having written to each of the buffers in the modified ordered list in an immediately previous defined time period, the buffer writer further configured to skip selecting one or more buffers in the modified ordered list that are deemed ineligible for writing.

4. The system of claim 1, wherein the reprioritization logic is configured to vary the sets selected for reordering between the defined time periods by segmenting the ordered list into a defined plurality of sets and randomly selecting the sets to be reordered from the plurality, at one or more defined reprioritization rates.

5. The system of claim 1, wherein the reprioritization logic is configured to utilize multiple reprioritization levels to select the sets for reordering, the ordered list segmented into different candidate sets at each reprioritization level, the candidate sets being of a different sizes for different reprioritization levels, the sets to be reordered being selected from the candidate sets, an average percentage of the sets selected for reordering, over time, differing for each of the reprioritization levels.

6. The system of claim 5, wherein the candidate sets increase in size with the reprioritization levels, wherein the average percentage of the sets selected decreases with the reprioritization levels.

7. The system of claim 1, wherein the reprioritization logic comprises a first reprioritization level in which adjacent sets of individual buffers in the ordered list are configured to be exchanged at a first reprioritization rate, a second reprioritization level in which adjacent sets of buffer pairs in the ordered list, as modified by the first reprioritization level, are configured to be exchanged at a second reprioritization rate, and a third reprioritization level in which adjacent sets of four buffers in the ordered list, as modified by the second reprioritization level are configured to be exchanged at a third reprioritization rate.

8. The system of claim 1, wherein the accounting component is configured to, in a given defined time period, update the buffer state information for only a subset of the buffers, the subset being less than all of the buffers.

9. The system of claim 1, further comprising:
   a read scheduler configured to schedule buffer read operations to read requested data units from the buffers;
   a buffer reader configured to read the requested data units from the buffers in accordance to the scheduling and provide the read data units to the one or more data unit processors;
   wherein the prioritization logic is configured to prioritize the scheduled read operations by ensuring that the ordered list generated for a given time period does not block any read operation scheduled by the read scheduler for the given time period.

10. The system of claim 1, further comprising a reprioritization adjuster configured to adjust rates at which the sets are selected for re-ordering based at least partially on the buffer state information.

11. A method comprising:
    identifying buffers available for a particular type of operation in a defined time period;

generating a prioritized list of the buffers from which to select particular buffers to assign to the particular type of operation in the defined time period;

re-ordering the prioritized list by exchanging positions of sets of one or more buffers within the ordered list;

starting at a beginning of the re-ordered prioritized list, whenever the particular type of operation is needed during the defined time period, assigning a next eligible buffer in the re-ordered prioritized list for performing the particular type of operation.

12. The method of claim 11, wherein the particular type of operation is storing a data unit within a buffer, each buffer of the buffers being accessible only a limited number of times in the defined time period.

13. The method of claim 11, further comprising calculating buffer state information for the buffers, wherein the defined time period is a particular clock cycle, wherein the buffer state information is calculated less frequently than each clock cycle, wherein generating the prioritized list of buffers comprises sorting the prioritized list of buffers based at least partially on the buffer state information.

14. The method of claim 11,
wherein re-ordering the prioritized list comprises:
segmenting the prioritized list into candidate sets of one or more buffers;
grouping the candidate sets into groups of two or more candidate sets;
for each group, when reprioritization logic indicates to re-order the group, trading positions of the two or more candidate sets within the prioritized list.

15. The method of claim 14, wherein the reprioritization logic is at least partially random and configured to indicate that a specified percentage of the groups be re-ordered over a plurality of time periods.

16. The method of claim 11,
wherein re-ordering the prioritized list comprises a plurality of iterations of:
segmenting the prioritized list into candidate sets of one or more buffers;
grouping the candidate sets into groups of two or more candidate sets;
for each group, when reprioritization logic indicates to re-order the group, trading positions of the two or more candidate sets within the prioritized list;
wherein in each of the iterations the candidate sets are of different sizes.

17. The method of claim 10, further comprising adjusting one or more rates at which the sets of one or more buffers are selected for re-ordering over multiple defined time periods based on changes to buffer state information.

18. The method of claim 11 wherein re-ordering the prioritized list comprises:
generating a first re-ordered prioritized list by randomly exchanging positions of adjacent buffers in the prioritized list;
generating a second re-ordered prioritized list by randomly exchanging positions of adjacent pairs of buffers in the first re-ordered prioritized list.

19. The method of claim 18, further comprising generating a third re-ordered prioritized list by randomly exchanging positions of adjacent groups of four buffers in the second re-ordered prioritized list.

20. One or more non-transitory computer-readable media storing instructions that, when executed by one or more computing devices, cause:
identifying buffers available for a particular type of operation in a defined time period;
generating a prioritized list of the buffers from which to select particular buffers to assign to the particular type of operation in the defined time period;
re-ordering the prioritized list by exchanging positions of sets of one or more buffers within the ordered list;
starting at a beginning of the re-ordered prioritized list, whenever the particular type of operation is needed during the defined time period, assigning a next buffer in the re-ordered prioritized list for performing the particular type of operation.

* * * * *

UNITED STATES PATENT AND TRADEMARK OFFICE
CERTIFICATE OF CORRECTION

PATENT NO.        : 10,263,919 B1
APPLICATION NO.   : 15/804779
DATED             : April 16, 2019
INVENTOR(S)       : Matthews et al.

Page 1 of 1

It is certified that error appears in the above-identified patent and that said Letters Patent is hereby corrected as shown below:

Column 36
Claim 5: Line 25: Delete "a"

Signed and Sealed this
Thirteenth Day of August, 2019

Andrei Iancu
*Director of the United States Patent and Trademark Office*